(12) United States Patent
Watanabe

(10) Patent No.: US 7,844,264 B2
(45) Date of Patent: Nov. 30, 2010

(54) RECEPTION DETERMINATION METHOD AND SYSTEM OF RAY, AND RADIO WAVE PROPAGATION CHARACTERISTIC ESTIMATION METHOD USING THEM

(75) Inventor: Yoshinori Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 2074 days.

(21) Appl. No.: 10/726,707

(22) Filed: Dec. 4, 2003

(65) Prior Publication Data

US 2004/0116113 A1     Jun. 17, 2004

(30) Foreign Application Priority Data

Dec. 11, 2002  (JP)  ............... 2002-358802

(51) Int. Cl.
*H04W 24/00*  (2009.01)
(52) U.S. Cl. ............... 455/423; 455/424; 455/422.1; 455/67.11; 455/67.16
(58) Field of Classification Search ............ 455/423, 455/424, 422.1
See application file for complete search history.

(56) References Cited

U.S. PATENT DOCUMENTS

| | | | |
|---|---|---|---|
| 5,949,988 A | 9/1999 | Feisullin et al. | |
| 6,470,195 B1 * | 10/2002 | Meyer | 455/562.1 |
| 7,085,697 B1 * | 8/2006 | Rappaport et al. | 703/13 |
| 2002/0065928 A1 * | 5/2002 | Senga et al. | 709/231 |

FOREIGN PATENT DOCUMENTS

| | | |
|---|---|---|
| JP | 8-8846 | 1/1996 |
| JP | 9-119955 | 5/1997 |
| JP | 10-62468 | 3/1998 |
| JP | 2001-133494 | 5/2001 |
| JP | 2002-107397 | 4/2002 |

OTHER PUBLICATIONS

"Ray Tracing as a Design Tool for Radio Networks" by John W. McKown, et. al. IEEE Network Magazine, Nov. 1991, pp. 27-30.

(Continued)

*Primary Examiner*—Patrick N Edouard
*Assistant Examiner*—Justin Y Lee
(74) *Attorney, Agent, or Firm*—Dickstein Shapiro LLP

(57) ABSTRACT

Reception points arranged inside an observation region are divided into groups for a plurality of reception points, and a hierarchical structure in which a reception point group having a large scale involves a smaller scale of plural reception point groups is structured in advance. In accordance with determination criteria defined in advance, the reception point groups involving the reception points which need reception determination processing with a ray are successively screened from the reception point groups having a large scale to a smaller scale of reception point groups, and the final reception determination of a ray and the reception points is applied only to the reception points involved in the screened reception point groups. Thereby, since a reception point group which is clearly excluded in the reception determination by means of a conventional technique can be collectively excluded by a reception point group unit involving them, the total number of the reception points to which the reception determination is applied can be reduced. As a result, required time for propagation estimation can be suppressed more than a conventional method.

24 Claims, 35 Drawing Sheets

OTHER PUBLICATIONS

"Site-Specific Propagation Prediction for Wireless In-Building Personal Communication System Design." by Scott Y. Seidel. IEEE Transactions on Vehicular Technology, Nov. 1994, vol. 43, No. 4, pp. 879-891.

Three-page document in Japanese (ISBN 4-88552-067-3).

Wei et al., "Ray-Tracing Models and Techniques for Coverage Prediction in Urban Environments", Microwave Conference, 1999 Asia Pacific Singapore, Nov. 30-Dec. 3, 1999, pp. 614-617 (1999).

Catedra et al., IEEE Antennas and Propagation Magazine, vol. 40, No. 2, pp. 15-28 (1998).

Japanese Office Action dated Dec. 6, 2005.

* cited by examiner

RECEPTION DETERMINATION METHOD AND SYSTEM OF RAY, AND RADIO WAVE PROPAGATION CHARACTERISTIC ESTIMATION METHOD USING THEM

BACKGROUND OF THE INVENTION

The present invention relates to a reception determination method and system of a ray, and a radio wave propagation characteristic estimation method using them, and especially, to a reception determination method and system of a ray in radio wave propagation characteristic estimation by means of a geometric optical technique, and a radio wave propagation characteristic estimation method using them.

In order to efficiently arrange a base unit (base station) in a radio communication system, it becomes important that a radio wave propagation characteristic such as a propagation loss and delay spread can be predicted on a computer with good accuracy and at high speed. Usually, an arrangement of the base unit in the radio communication system is conducted by try and error so that a region where communication is desired would be a range where a codeless handset (terminal) can communicate. However, a method in which the base unit and codeless handset are installed in real environment to study the arrangement of the base unit by means of actual measurement generally requires tremendous costs. Accordingly, in case of suppressing an installation cost, a method in which a propagation model of the said environment is structured on a computer to study the arrangement of the base unit theoretically is used.

The range where the codeless handset can communicate is defined by comparing parameters such as intensity at which the codeless handset receives a radio wave radiated from the base unit, extent of distortion which a signal on a transmission line connecting the base unit to the codeless handset suffers, and intensity of an interference signal mixed into receivers of both base unit and codeless handset from a radio system other than the said radio system with a characteristic of the receivers. These parameters can be calculated from a radio wave propagation characteristic such as a propagation loss and delay spread of a transmission line between the base unit and the codeless handset of the said radio system, and a propagation loss between an external interference source and the base unit or the codeless handset of the said radio system. Accordingly, if the radio wave propagation characteristic such as a propagation loss and delay spread can be predicted on a computer with good accuracy and at high speed, an optimum arrangement of the base unit, which requires trial-and-error study in response to individual propagation environment, can be determined rapidly and correctly independent of actual measurement.

As a prior art for predicting the radio wave propagation characteristic by using the computer in this manner, there is a method in which a radio wave propagation simulator is used, and the radio wave propagation simulator forming the basis thereof can be generally classified broadly into a statistical technique and a deterministic technique. The statistical technique is a technique wherein a propagation loss estimation formula in which a distance, a frequency and so forth are arguments is used, and the parameters in the estimation formula are determined by means of a statistical technique such as a multivariate analysis based on a number of data obtained by the actual measurement of a propagation loss. Although this technique was conventionally used for application of a base station arrangement design or the like of outdoor mobile communication, it is generally an expensive technique since a number of actually measured data are required for determining the propagation loss estimation formula of the said environment with high accuracy. In addition, since this technique is one for statistically obtaining an average tendency of the radio wave propagation characteristic in a somewhat wide range, it is not appropriate for environment wherein the propagation characteristic tends to vary widely due to diversification of an indoor arrangement of an appliance, a wall or the like, and application for obtaining the local propagation characteristic in a comparatively narrow range even out of doors.

On the other hand, the deterministic technique is a technique for obtaining the propagation characteristic from a numerical analysis result of a Maxwell electromagnetic equation that is a fundamental equation of the radio wave propagation. Since this technique is based on a physical law, compared with the statistical technique, highly accurate prediction is possible. However, as described in a Non-Patent Publication 1, out of the deterministic techniques, in many techniques like an FDTD, a finite element method and so forth, a computational effort necessary for the analysis becomes huge as a wavelength becomes short compared with an analysis subject region of the propagation characteristic. Accordingly, a lot of computational resources are required for establishing high-speed and highly accurate prediction of the propagation characteristic in such a high frequency band.

Presently, in association with a growing demand for speeding-up of communication, development of a radio communication system which uses a higher frequency band is actively being conducted. Out of the deterministic techniques, there is a geometric optical technique (ray tracing) as a technique appropriate for an analysis of such a high frequency band. This technique has a feature that, compared with other deterministic techniques, highly accurate analysis of the high frequency band can be conducted at high speed.

This ray tracing is a technique in which a radio wave radiated from an antenna is represented by a bunch of a number of radio wave lines (rays), and assuming that each ray is propagated while repeating reflection and transmission geometrically-optically in an obstruction installed inside an analysis space, a locus thereof is calculated. A propagation loss and delay spread at a reception point can be obtained by combining electrical field strength and a propagation period of time of each ray which arrives at the reception point.

The ray tracing can be further classified broadly into an imaging method and a launching method because of a difference of a method of tracing a propagation path. One example of a radio wave propagation simulator using the imaging method is described in a Non-Patent Publication 2. As described in this publication, the imaging method is a technique for determining a reflection and transmission path of a ray, which connects transmission and reception points, while obtaining a mirror image of the transmission point for a reflection plane. Since the reflection and transmission path is obtained uniquely if positions of the transmission and reception points and a reflection and transmission barrier are determined, the imaging method is a technique for searching a rigorous propagation path of the ray.

On the other hand, the launching method is a technique in which, independently of a position of a reception point, a ray which was radiated from an antenna at a discrete angle interval and passed the vicinity of the reception point while repeating reflection, transmission or the like is regarded as a ray which reached the said reception point. Since, in the launching method, a solution of a propagation path of a ray, which connects the transmission and reception points, is not obtained rigorously different from the imaging method, but is obtained approximately, it has a feature that a time period required for the propagation path search can be significantly shortened.

FIG. 33 is a view explaining an outline of a flow of the processing of the launching method, and is also applied to the present invention. First, at a step 102, initial setting of a storage region in which structural information inside an observation region is stored, and a storage region in which propagation characteristic information of a reception point is stored is conducted, and calculation of a direction vector of a ray set radiated from a transmission point is conducted. Next, at a step 103, one ray is selected out of the ray set radiated from the transmission point, and a path of the ray after the selected ray was radiated from the transmission point is tracked (step 104). At this time, every time one sectional path is defined in process of path tracking processing, one section just after the definition is selected (step 112), and it is determined whether or not a ray passing through the selected path section is received at the reception point inside the observation region (step 107). These path tracking processing and reception determination processing continue until an end condition of the path tracking is satisfied (step 105), and the above processing is applied to all rays radiated from the transmission point (step 109), and a result is output and the processing is finished (step 110).

FIG. 34 is a view showing the particular processing in the step 107. In the step 107, first, one reception point inside the observation region is selected (step 114), and it is determined whether or not the ray passing on the path section selected at the step 112 is received at the reception point selected at the step 114 (step 115). If it is determined at the step 115 that it is not received, the processing promptly moves to the next process, and if it is determined that it is received, reception electrical field strength and delay time are calculated (step 117), and calculation results are stored in a storage region corresponding to the said reception point (step 118). The determination at the step 115 is performed for all reception points (step 116), and the reception determination processing is finished.

FIG. 35 is a view explaining the path tracking processing in case that an observation region 018, a transmission point 016, a reception point 017, and two objects 001 and 002 are provided. In FIG. 35, although, for simplification, the explanation of the processing will be made by restricting it to a two-dimensional plane, in actual, the processing can be certainly conducted within a three-dimensional space. One orientation of a ray to be radiated from the transmission point 016 is selected out of orientations 008-015 (In FIG. 35, an orientation 015 is selected.), and a ray is radiated. An object intersecting with a ray 003, end point of which is the transmission point 016, is searched from objects inside the observation region to obtain an intersection point 019, and in accordance with a geometrical optics theory, a reflected ray 005 and a transmitted ray 004 are generated. An object intersecting with the reflected ray 005 is searched from the objects inside the observation region to obtain intersection point 020, and a reflected ray 006 and a transmitted ray 007 are generated again. In this manner, the search of the object intersecting with the ray, the calculation of the intersection point, and the generation of the reflected ray and the transmitted ray are repeated, and the path tracking processing is finished at a time point when the reflected ray and the transmitted ray meet a tracking end condition.

For the tracking end condition, a case wherein the ray has reached the observation region 018, a case wherein the reflection number or the transmission number has reached a predetermined upper limit, a case wherein electrical field strength determined by a locus of the ray has been lower than a predetermined value and so forth are generally used. By means of such path tracking processing, in FIG. 35, for example, a path consisting of sections 003, 005 and 006, a path consisting of sections 003 and 004, and a path consisting of sections 003, 005 and 007 can be obtained.

One example of a prior art for determining an orientation of a ray to be radiated from the transmission point is described in a Non-Patent Publication 3. FIG. 36-FIG. 39 views explaining this prior art.

According to a method described in this publication, first, as shown in FIG. 36, a three-dimensional closed region of a regular icosahedron is provided around a transmission antenna 301. Next, after taking a plane forming the regular icosahedron, namely, a plane of a regular triangle, which is constructed of apexes 406, 407 and 408, as shown in FIG. 37, each side is divided at even intervals by using points 409, 410 and 411. By drawing line segments that are parallel with each side of the regular triangle constructed of the apexes 406, 407 and 408, and passes through divisional points, triangles similar to the original regular triangle are newly created inside. The above processing is applied to all planes constituting the regular icosahedron of FIG. 36, and if the apexes of each regular triangle are moved in a direction which connects a center of mass of the regular icosahedron to the apexes of the newly created regular triangle so that distances from the center of mass become equal to each other, a view like FIG. 38 for example can be obtained.

FIG. 38 is a view of a case in which one side of the regular triangle forming each plane of the regular icosahedron of FIG. 36 is halved. Rays to be radiated from the transmission antenna 501 positioned at the center of mass of the original regular icosahedron are radiated in each direction which connects the transmission antenna 501 to each apex of the polyhedron of FIG. 38. In FIG. 38, as one example, a ray 504 passing through an apex 502 is shown. The definite number of rays determined in this manner become a set of rays to be radiated from the transmission point.

In the vicinity of the ray created in accordance with the above-described method, a partial space can be defined, and by means of the partial space, a space around the transmission point 501 can be divided into mutually exclusive partial spaces. FIG. 39 is a view in which a partial space in the vicinity of the ray created in accordance with the above-described method is extracted. In the vicinity of the ray 504, a region 505 of a pyramid is defined, a cross-sectional shape thereof, which is taken by a plane perpendicular to the ray 504 being a hexagon and an apex thereof being the transmission point 501. By defining the partial space in the vicinity of the ray in this manner, the determination (step 107) on whether or not a certain reception point receives a ray passing through the vicinity thereof comes down to determination on whether or not the reception point is included in this partial space defined in the vicinity of the ray. In addition, although, following the above-described method, the partial space would be a regular six-sided pyramid or a regular five-sided pyramid, other than this, sometimes there is a case in which a triangular pyramid is used for the partial space.

Out of the ray tracing methods, compared with the launching method, a calculation load in the imaging method is much larger. Accordingly, some technologies for realizing speeding-up are devised, and one example of the conventional technologies is described in a Patent Publication 1 and a Patent Publication 2. However, even in case that these techniques for speeding-up are applied, generally an estimation speed of the imaging method is slower than that of the launching method. Also, an estimation accuracy of the imaging method is theoretically higher than that of the launching method, and however, since a structural model used in a simulation is often simplified to a certain extent, due to an effect of an error between the model and real environment, in most cases, the estimation accuracy of the imaging method is not so different from that of the launching method.

As mentioned above, in order to conduct an arrangement of the base unit of the radio communication system efficiently, it becomes important to be able to estimate a highly accurate radio wave propagation characteristic of a desired region with a high speed. Accordingly, if application to such use is considered, a technical approach for realizing the fast estimation by means of the launching method rather than the imaging method without deteriorating the estimation accuracy is important, and a prior art for realizing this is described in a Patent Publication 3.

In the processing of the launching method described in FIG. 33, as one of the processes, calculation load of which is large, there is the path tracking processing of the step 104. In the Patent Publication 3, a prior art for realizing this path tracking processing with a high speed is described. Since the path tracking processing accompanies the intersection determination of a ray and obstacles installed inside an analysis region, a calculation load increases in proportion to the total number of the obstacles. Also, in case that an upper limit for the total number of reflection and transmission is provided, and this would be an end condition of the path tracking, a calculation load of the path tracking increases if the upper limit for the total number of the reflection and transmission is raised. Further, with regard to the path tracking processing, the calculation load increases in proportion to the total number of the rays to be radiated from the transmission point.

Particularly, assuming that M is the total number of the obstacles installed inside the analysis region, N is the upper limit for the total number of the reflection and transmission, W is the total number of the rays to be radiated from the transmission point, and δ1 is calculation time required for one intersection determination, entire calculation time T1 required for the intersection determination of the obstacles and the ray is represented as follows:

$$T1 = MW(2^{N+1}-1)\delta 1 \quad (1)$$

In the launching method, generally, when the total number of the rays to be radiated from the transmission point or the total number of the reflection and transmission is increased, the estimation accuracy of the radio wave propagation characteristic is improved. On the other hand, generally, there are many obstacles inside the analysis space. Accordingly, in a case where a highly accurate estimation is conducted under real environment, a calculation load of the path tracking generally becomes large.

In the prior art described in the Patent Publication 3, the intersection determination of the obstacles and the ray is not conducted without variation, and step-by-step determination conditions in which a projected image is utilized and calculation loads are different from each other are used. According to this arrangement, the obstacles which do not intersect clearly can be excluded early by means of the determination conditions in which the calculation load is small, and as a result, reduction of Mδ1 in the equation (1) is possible, that is to say, the calculation time required for the intersection determination can be reduced.

[Patent Publication 1]
JP-P1996-008846A (U.S. Pat. No.3,256,085) (Page 4-Page 8, FIG. 1, FIG. 4-FIG. 24)
[Patent Publication 2]
JP-P1997-119955A (Page 4-Page 5, FIG. 8-FIG. 16)
[Patent Publication 3]
JP-P2002-107397A (Page 6-Page 8, FIG. 1-FIG. 5)
[Non-Patent Publication 1]
Eikichi Yamashita, "Fundamental Analysis Method of Electromagnetic Wave Questions", pp.198, The Institute of Electronics, Information and Communication Engineers, 1987
[Non-Patent Publication 2]
J. W. MacKown and R. L. Hamilton Jr., "Ray Tracing as a Design Tool for Radio Networks" IEEE Network Mag, pp.27-30, November 1991
[Non-Patent Publication 3]
S. Y. Seidel and T. S. Rappaport, "Site-Specific Propagation Prediction for Wireless In-Building Personal Communication System Design" IEEE Trans Veh Technol, 43, 4, pp.879-891, 1994

In the processing of the launching method of FIG. 33, even though speeding-up of the path tracking is pursued to the maximum, there is a task that the calculation time required for the propagation estimation would not be equal to or less than a certain level. The reason thereof is that the calculation time required for the reception determination processing at the step 107 of FIG. 33 relatively becomes larger as the time required for the path tracking processing is shortened.

Since the reception determination processing (step 115) of FIG. 34 is surrounded by multiple loops consisting of the step 103 and the step 109, the step 104 and the step 105, and the step 114 and the step 116, any one of the total number of the rays to be radiated from the transmission point, the total number of the path sections, namely, the total number of the reflection and transmission, and the total number of the reception points is increased, it causes the increase of the entire calculation time required for the reception determination processing. Particularly, assuming that P is the total number of the reception points inside the analysis region, N is the upper limit for the total number of the reflection and transmission, W is the total number of the rays to be radiated from the transmission point, and δ2 is calculation time required for one reception determination, entire calculation time T2 required for the reception determination processing is represented as follows:

$$T2 = PW(2^{N+1}-1)\delta 2 \quad (2)$$

As a sum of the calculation time T1 required for the path tracking of the equation (1) and the calculation time T2 required for the reception determination processing of the equation (2), calculation time T3 required for the propagation estimation can be approximately represented as follows:

$$T3 = W(2^{N+1}-1)(M\delta 1 + P\delta 2) \quad (3)$$

As understood from the equation (3), as the speeding-up of the path tracking processing is undertaken to reduce Mδ1, the calculation time T3 required for the propagation estimation asymptotically moves closer to the entire calculation time T2 required for the reception determination processing, and finally, bottoms out at a value thereof. On the other hand, if the total number of the reception points is reduced to suppress the calculation time required for the reception determination, there is a task that it becomes difficult to look through the propagation characteristic of the entire observation region with a higher accuracy. A reason thereof is that, in case that the reception points are arranged inside the observation region in a lattice shape for the purpose of looking through the propagation characteristic of the entire observation region, when the number of the entire reception points is reduced, an individual lattice interval is broadened, and it becomes difficult to understand a tendency of the local propagation characteristic.

SUMMARY OF THE INVENTION

The objective of the present invention is to provide a reception determination method and system of a ray, and a radio wave propagation characteristic estimation method using them, which shorten required estimation time without deteriorating an estimation accuracy in the launching method.

In accordance with the present invention, a reception determination method of a ray is obtained, in which a path of a ray provided within an observation region is predicted, and reception determination processing is applied to reception points of said ray, which are arranged in advance within said observation region, characterized in that the reception points arranged within said observation region are divided into groups for singular or plural reception points, and said reception determination processing is applied to reception point groups including the reception points to which said reception determination processing is needed to be applied.

In accordance with the present invention, a reception determination system of a ray is obtained, in which a path of a ray provided within an observation region is predicted, and reception determination processing is applied to reception points of said ray, which are arranged in advance within said observation region, characterized in that the reception determination system includes: grouping means for grouping the reception points arranged within said observation region for singular or plural reception points; and reception determination means for applying said reception determination processing to reception point groups including the reception points to which said reception determination processing is needed to be applied.

In accordance with the present invention, a program for having a reception determination method of a ray executed by a computer is obtained, in which a path of a ray provided within an observation region is predicted, and reception determination processing is applied to reception points of said ray, which are arranged in advance within said observation region, the computer readable program being characterized in that the reception points arranged within said observation region are divided into groups for singular or plural reception points, and said reception determination processing is applied to reception point groups including the reception points to which said reception determination processing is needed to be applied.

The present invention has the first feature that it has a configuration wherein the reception points within the observation region are divided into groups for plural reception points, and hierarchical grouping processing is applied to the reception points so that a structure in which a reception point group having a large scale involves a smaller scale of plural reception point groups is formed, and structure information of an implication relationship of the reception point groups between different hierarchies and the reception points or the like included in the reception point groups is constructed in advance.

It has the second feature that it has a configuration wherein, using the structure information of the reception point groups, which was constructed in the first feature, screening processing for leaving only the reception point groups including the reception points inside, which need the reception determination processing, is applied to the reception point groups inside the observation region, and further, it shows an operation that, referring to the hierarchical structure information constructed in the first feature, the screening is conducted stepwise by means of a successive transition from a large scale of the reception point group to a small scale of the reception point group, and further, it has a configuration wherein the reception determination processing is applied to only the reception points included in the finally screened reception point groups.

The present invention has the third feature that it has a configuration wherein the screening determination of the reception point groups in the second feature is conducted by means of intersection determination of a region involving a region where the reception point groups are defined and a region which is defined in the vicinity of the ray, and in this determination calculation, the reception points included in the reception point groups are collectively excluded, and it has a configuration wherein the reception points at which the ray is finally received are not changed from a result obtained by means of a conventional technique.

The present invention has the fourth feature that the screening determination of the reception point groups in the second feature is operated so that it is successively applied to each reception point group until it is finished to the reception point groups belonging to the same hierarchy within the observation region, and thereafter, it is moved to the next hierarchy consisting of a smaller scale of reception point groups, and similarly, said screening processing is applied to each reception point group until it is finished to the reception point groups which would be a subject of the screening determination inside the same hierarchy (FIG. 3, FIG. 4).

The present invention has the fifth feature that, first, the screening determination of the reception point groups in the second feature is applied to one of the reception point groups within the observation region, and then, a smaller scale of one reception point group involved in the reception point groups is selected from the next hierarchy to apply said screening determination thereto, and at a step when arriving at a hierarchy of reception point groups which cannot be finally divided while moving to hierarchies sequentially, the reception determination processing is applied to reception points involved in said reception point groups, and thereafter, the screening determination of the reception point groups is applied to non-selected reception point groups in a one-stage upper hierarchy, and whereby the screening determination processing is recursively operated (FIG. 3, FIG. 26).

In accordance with the first to fifth features of the present invention, the reception point groups to be clearly excluded in the reception determination can be collectively excluded by a unit of the reception point group including them by means of the simple determination calculation. Thereby, since, compared with a conventional technique in which the reception determination having the same calculation load is successively applied to all of the reception points arranged within the observation region, the total number of the reception points for which the reception determination calculation having a large computational efforts is performed can be reduced, entire calculation time can be suppressed.

The present invention has the sixth feature that it has a configuration wherein, as the region involving the region in the third feature, in which the reception point groups are defined, a sphere circumscribed with the reception point groups is utilized. In accordance with this configuration, since the screening of the reception point groups is conducted by means of the simple determination calculation in which distance determination between a small number of points and straight lines is a main constitution element, the screening processing of the reception point groups can be conducted at a high speed.

The present invention has the seventh feature that it has a configuration wherein, in case that the reception points are provided in the shape of a planar lattice, and as the region involving the region in which the reception point groups are defined, the sphere circumscribed with the reception point groups is utilized, in the hierarchical grouping processing of the reception points in the first feature, when lattice points which stand in a line on a most outer side form a rectangle, the number of the reception points (most external contour reception points, hereinafter) which stand in a line on two sides thereof is resolved into a sum of $a^n$ (a is an integer equal to or more than 1, and n is an integer including 0), and after square regions in which each factor of the generated $a^n$ by means of the resolution is assumed to be the number of the most external contour reception points are newly generated, out of these square regions, the regions having a greater area are spread inside said observation point region as much as possible, and further, by successively dividing each of the spread square regions into $a^2$ square regions having the same area, a hierarchical group of the reception points is structured. In accordance with this configuration, an arbitrary number of the reception points provided in the shape of a planar lattice can be easily divided into hierarchical groups.

The present invention has the eighth feature that it has a configuration wherein the screening determination of the reception point groups in the second feature is conducted by means of the intersection determination of a region sandwiched between two infinite planes including each barrier, respectively, which is positioned at both ends of the ray that would be a subject of the reception determination, and the region defining the reception point groups. In accordance with this configuration, in case that the region defining the reception point groups is a polyhedron or a polygon, the number of apexes of which is less, and an interval of said barrier is narrow, compared with a case where the intersection determination of the region involving the region in which the reception point groups are defined and the region defined in the vicinity of the ray is used together, a similar degree of a screening effect of the reception point groups can be realized by means of simpler determination calculation.

The present invention has the ninth feature that it has a configuration wherein, in the screening determination of the reception point groups in the second feature, when it is determined whether or not the reception point groups are divided into a smaller scale of reception point groups, it is conducted by considering a value of a cost function defined in advance. In accordance with this configuration, by appropriately defining the cost function according to the situation, the division of the reception point groups is finished at a desired arbitrary hierarchy, and it is possible to move to the reception determination of the internal reception points, and flexible and efficient reception determination processing can be realized.

The present invention has the tenth feature that it has a configuration wherein, as the region involving the reception point groups in the third feature, like FIG. 29, a region defined by a combination of regions divided by singular or plural planes is used. In accordance with this configuration, since it is possible to reduce null regions where the reception points do not exist, which might occurs in case that, like FIG. 16, as the region involving the region in which the reception point groups are defined, the circumscribed sphere is used, unnecessary reception determination calculation of the reception points within the reception point groups and the ray can be reduced.

BRIEF DESCRIPTION OF THE DRAWINGS

This and other objects, features and advantages of the present invention will become more apparent upon a reading of the following detailed description and drawings, in which:

FIG. 13 is a view explaining a division process of the first layer of the reception point groups in the first embodiment (in a case where the observation region is a rectangle);

FIG. 15 is a view explaining a different method of a division process of the second layer of the reception point groups in the first embodiment (in a case where the observation region is a rectangle);

DESCRIPTION OF THE EMBODIMENTS

Figure 1:
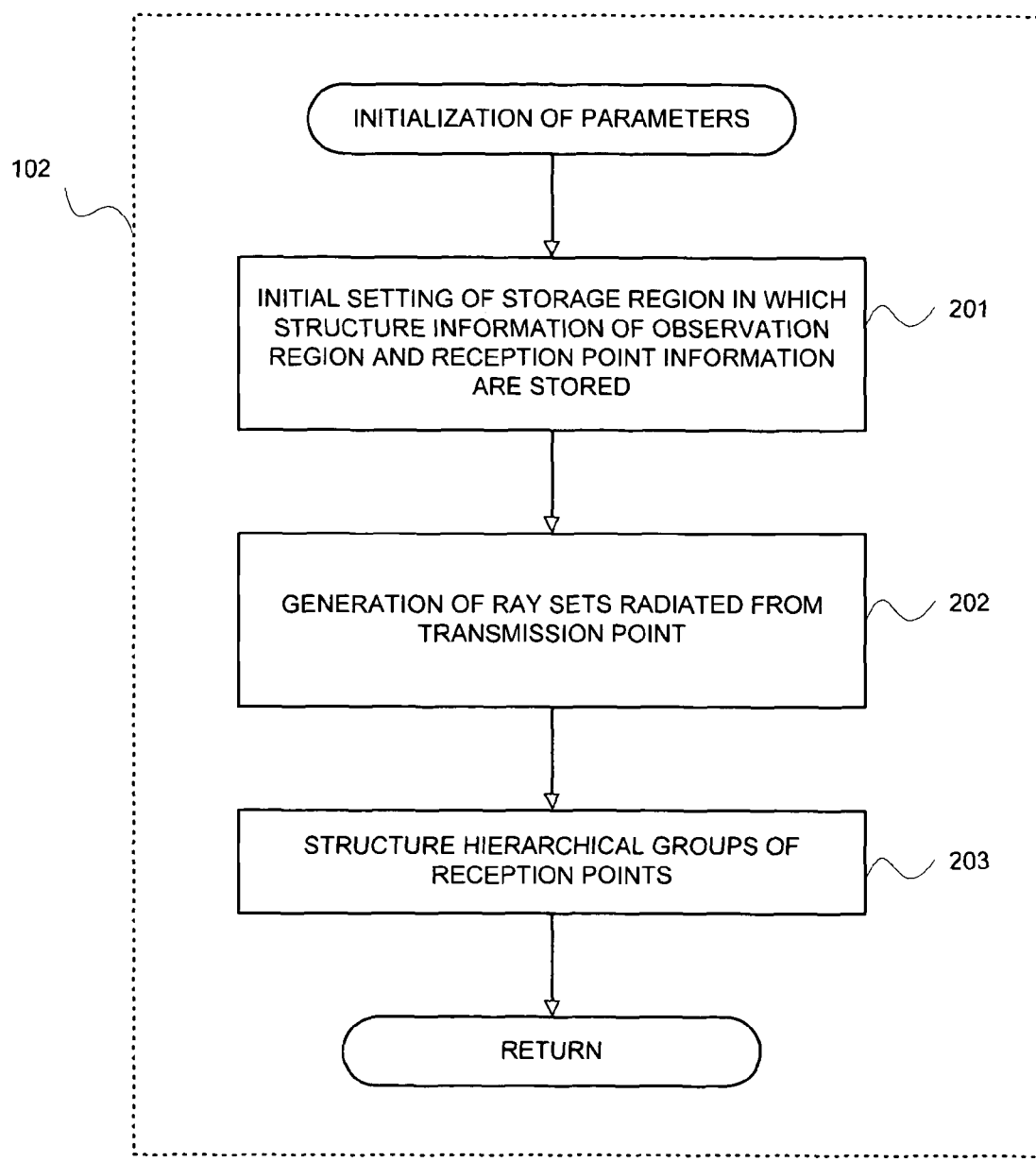
FIG. 1 is a flow chart showing an arrangement of an initialization section in the first embodiment of the present invention.
Figure 2:
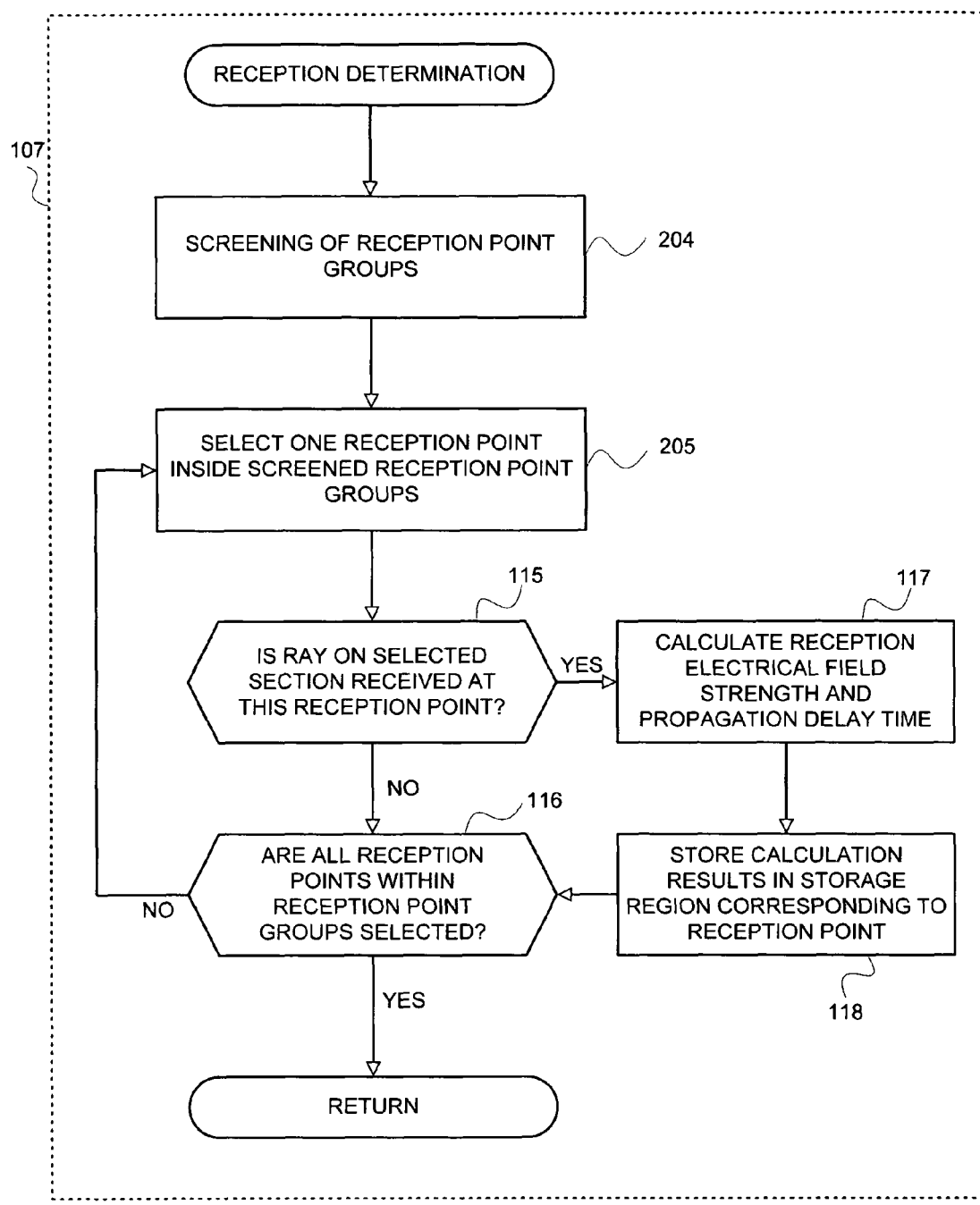
FIG. 2 is a flow chart showing an arrangement of a reception determination section in the first embodiment of the present invention.

Below, referring to drawings, embodiments of the present invention will be explained in detail. FIG. 1 and FIG. 2 are flow charts showing embodiments of initialization processing and reception determination processing of the launching method in accordance with the present invention, respectively. The processing of FIG. 1 corresponds to the step 102 of FIG. 33, and the processing of FIG. 2 corresponds to the step 107 of FIG. 33.

In the initialization processing of FIG. 1, first, like in the conventional techniques, initial setting of a storage region in which structure information of geography, an obstacle or the like inside an observation region is stored, and a storage region in which propagation characteristic information of reception points is stored is conducted (step 201), and subsequently, a radiation direction vector of each ray to be radiated from a transmission point is calculated (step 202). Thereafter, the reception points within the observation region are divided into groups for a plurality of reception points. At this time, hierarchical grouping processing is conducted so that a structure in which a reception point group having a large scale involves a smaller scale of plural reception point groups is formed. And, structure information of an implication relationship or the like between the reception point groups belonging to different hierarchies is stored in the storage region (step 203).

In the reception determination processing of FIG. 2, first, in accordance with determination criteria defined in advance, reception point groups including only reception points to which determination of a step 115 is not needed to be applied are excluded (step 204). At this time, the exclusion determination of the reception point groups is defined so that cases are generated through entire propagation estimation as much as possible, in which calculation having a load smaller than a total sum of calculation loads in a case where the determination of the step 115 is applied to all reception points included in the reception point groups can be conducted. Next, the reception determination with a ray on a path section is applied only to the reception points included in the finally screened reception point groups (steps 205, 115, 116). For the reception points which were determined to receive a ray in this determination, calculation of reception electrical field strength and propagation delay time is conducted, and results thereof are stored in the storage region (steps 117, 118).

Figure 3:
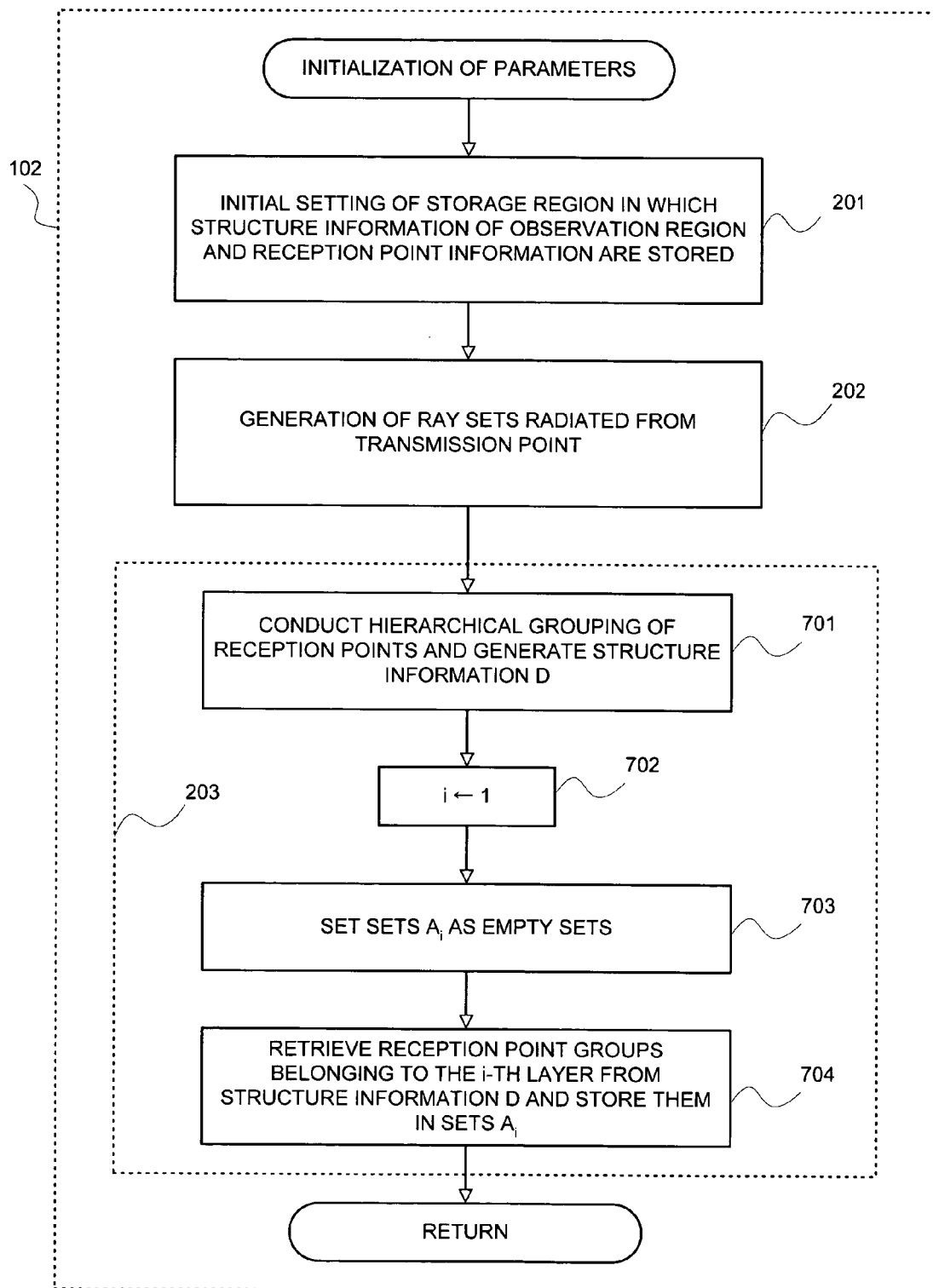
FIG. 3 is a flow chart showing a particular example of an operation of an initialization section in the first embodiment of the present invention.
Figure 4:
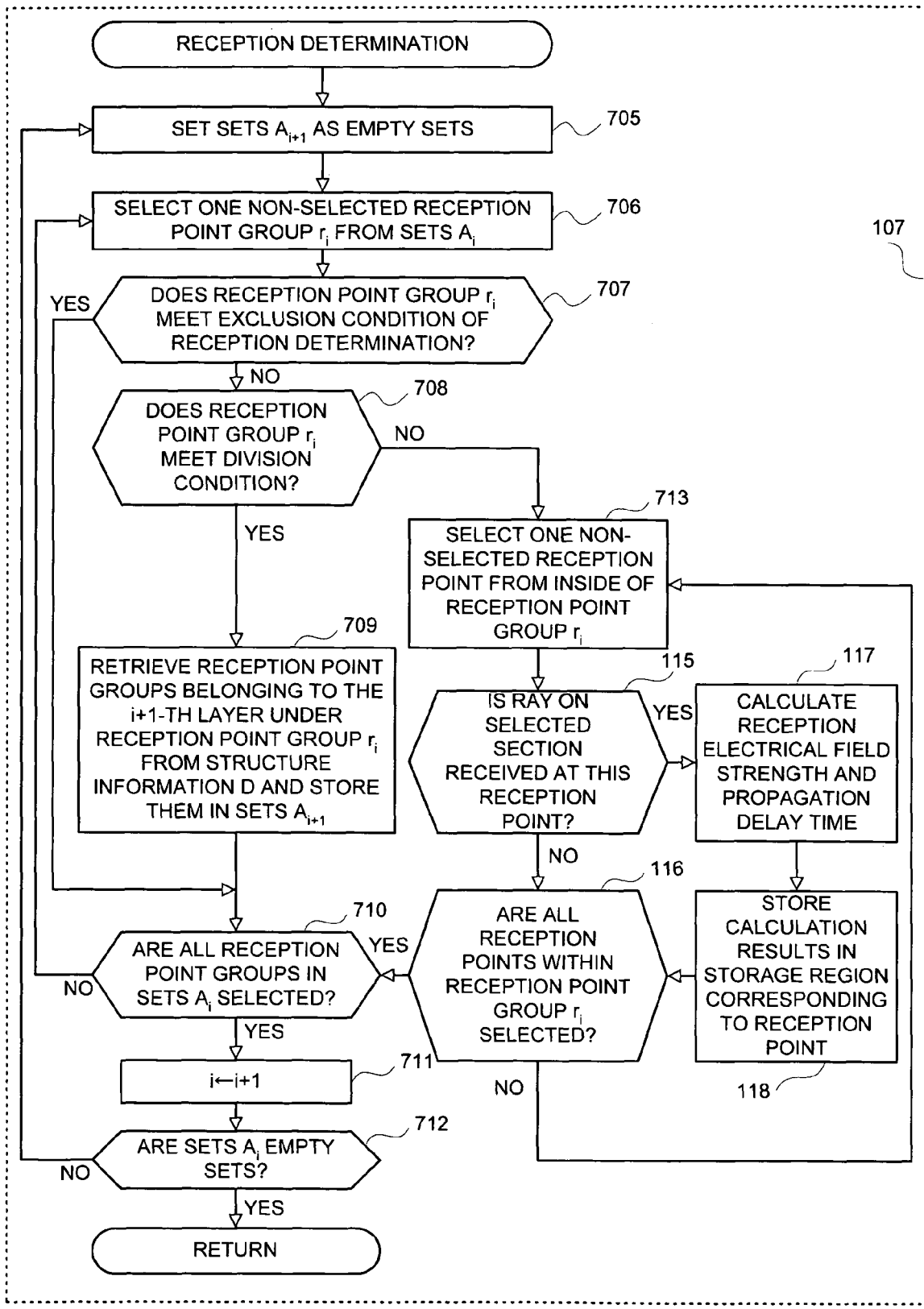
FIG. 4 is a flow chart showing a particular example of an operation of a reception determination section in the first embodiment of the present invention.

Referring to the drawings, the detail of the initialization processing and the reception determination processing of the launching method in the present invention will be explained below. FIG. 3 and FIG. 4 are flow charts showing an operation example of the initialization processing and the reception determination processing, respectively.

First of all, referring to FIG. 3, the initialization processing will be explained in detail. First, like in the conventional techniques, the initial setting (step 201) of the storage region in which the structure information inside the observation region is stored, and the storage region in which the propagation characteristic information of the reception points is stored, and the calculation of the direction vector of a ray to be radiated from the transmission point are conducted (step 202). Next, at a step 701, the hierarchical grouping processing of the reception points in accordance with the present invention is conducted, and the structure information D thereof is stored in the storage region. At this time, the i-th layer of the reception point groups generated by means of the hierarchical grouping processing involves the i+1-th layer of the reception point groups (i is an integer equal to or greater than 1.).

Following the step 701, after an internal variable i is set at 1 at a step 702, at step 703, a working set A1 having the first layer of the reception point groups as its elements is provided and A1 is initialized to an empty set, and the structure information D is retrieved to extract all reception point groups belonging to the first layer (a hierarchy just below the observation region) and add them to the set A1 (step 704).

Next, referring to FIG. 4, the reception determination processing will be explained in detail. First, after working sets Ai+1 having the i+1-th layer of the reception point groups as its elements are initialized to empty sets at a step 705, one reception point group ri is selected from the sets Ai (step 706), and it is determined whether or not this reception point group ri meets an exclusion condition of the reception determination, which is defined in advance (step 707). Here, if it is determined that the exclusion condition of the reception determination is met, the selected reception point group ri is discarded, and in order to select a new reception point group ri, at a step 710, it is determined whether or not non-selected reception point groups exist in the sets Ai. In this determination, if it is determined that the non-selected reception point groups exist, the process returns to the step 706, and the new reception point group ri is selected.

Figure 33:
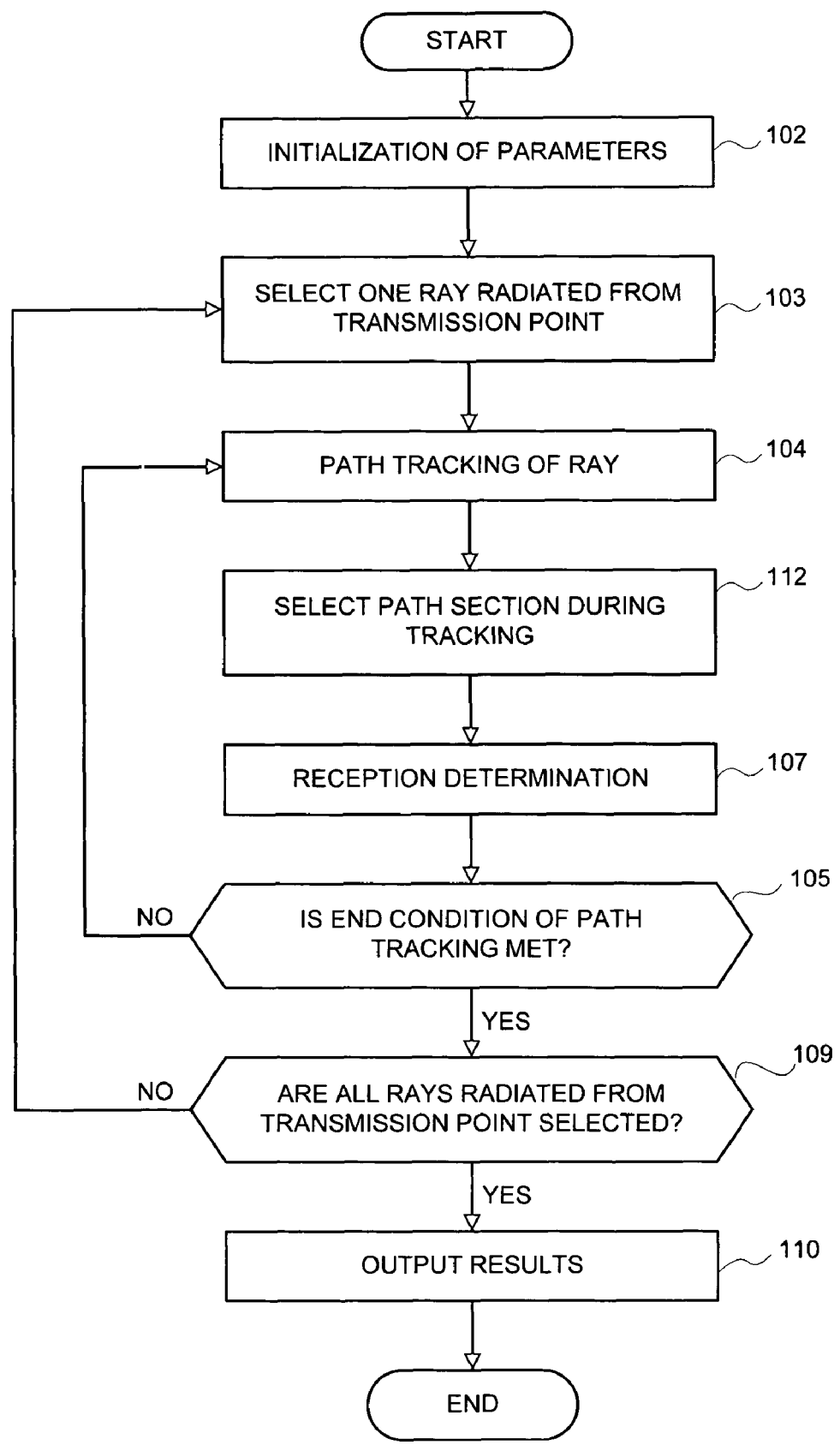
FIG. 33 is a view explaining an outline of a flow of processing of a launching method.
Figure 34:
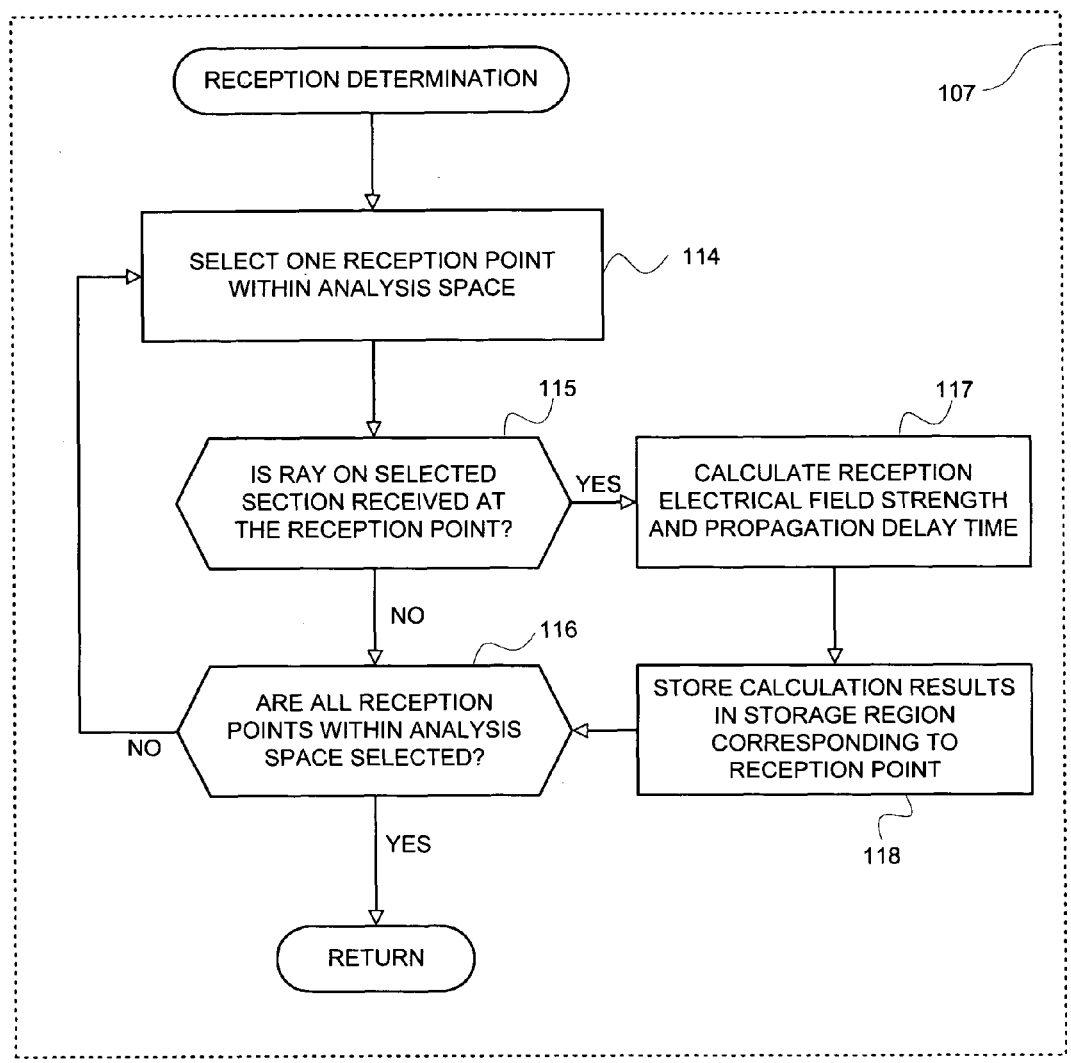
FIG. 34 is a flow chart showing a reception determination section of a launching method of a prior art.
Figure 35:
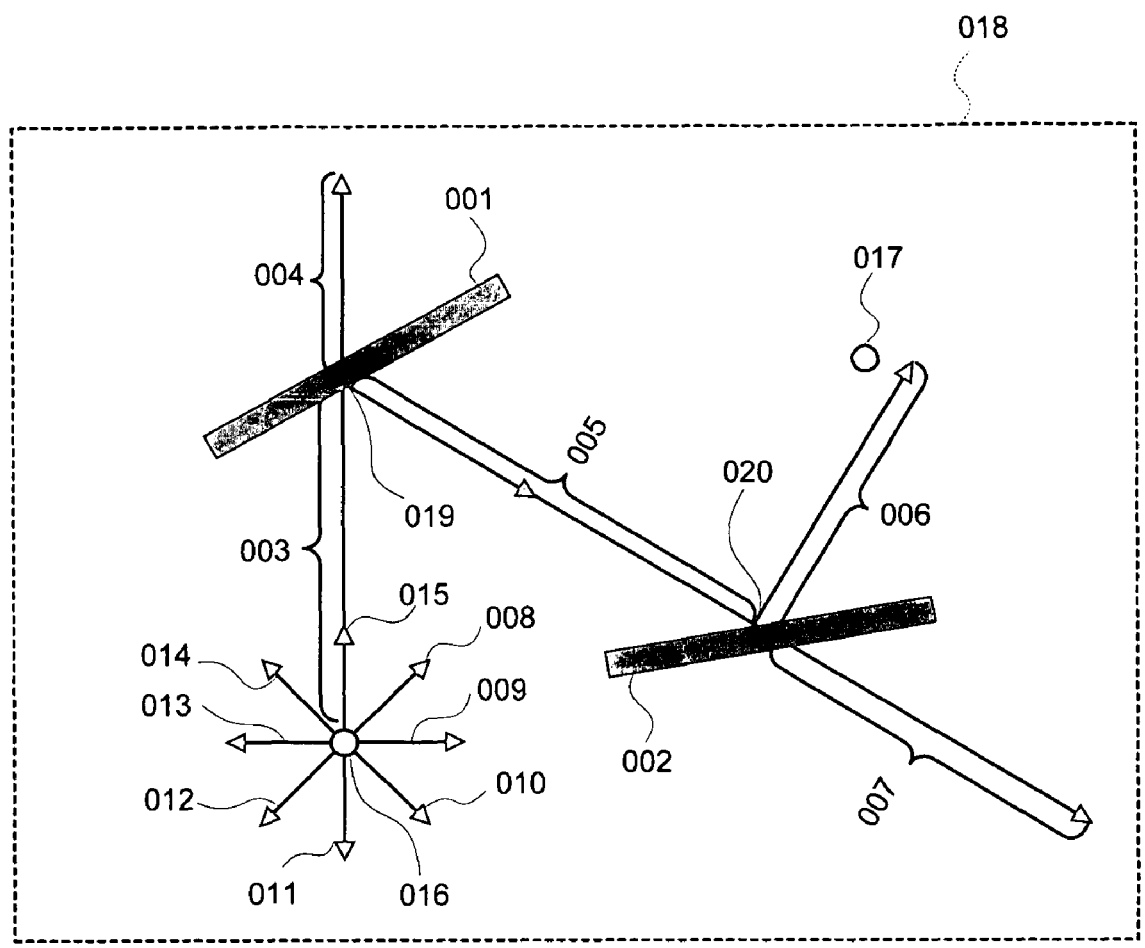
FIG. 35 is a view explaining path tracking processing of the launching method.
Figure 36:
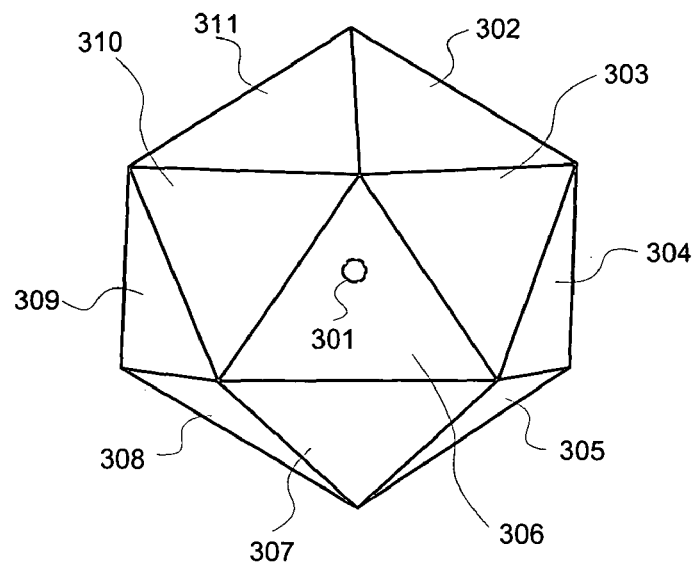
FIG. 36 is a view explaining a prior art for generating a ray set to be radiated from a transmission point.
Figure 37:
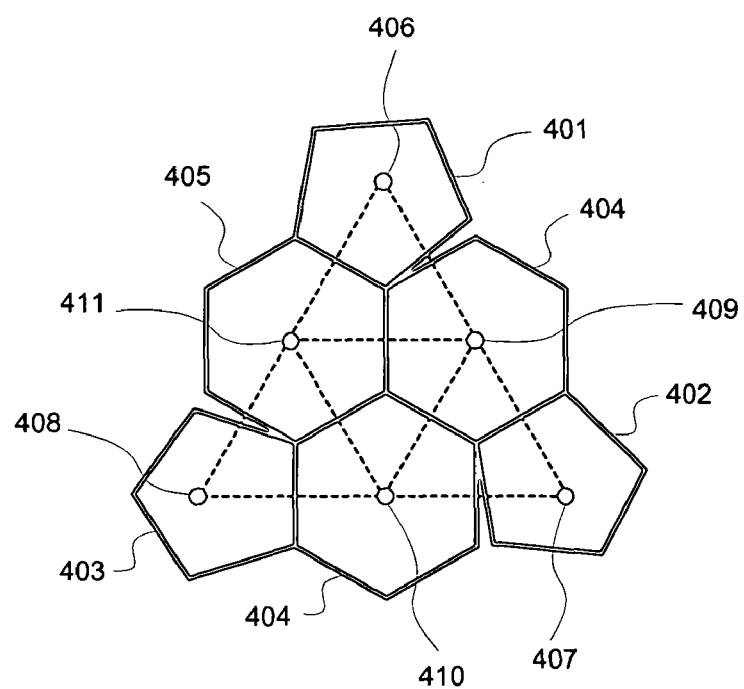
FIG. 37 is a view explaining a prior art for generating a ray set to be radiated from a transmission point.
Figure 38:
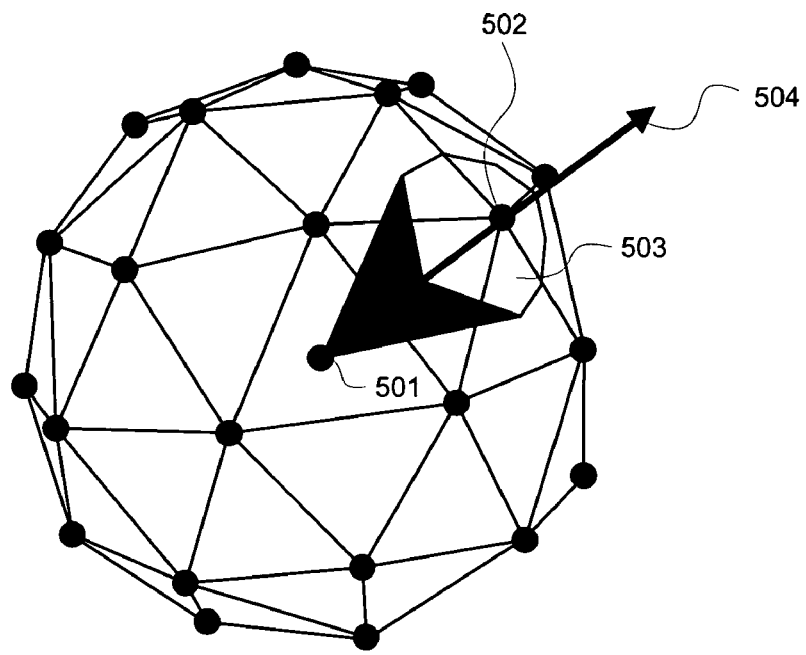
FIG. 38 is a view explaining a prior art for generating a ray set to be radiated from a transmission point.

On the other hand, if the reception point group ri does not meet the exclusion condition of the reception determination at the step 707, continuously the processing of the reception determination is conducted. First, at a step 708, it is determined whether or not the reception point group ri meets a division condition defined in advance, and if it is determined that this division condition is met, at a step 709, the structure information D is retrieved to extract all reception point groups belonging to the i+1-th layer under the reception point group ri, and add them to the sets Ai+1. On the other hand, if it is determined that the reception point group ri does not meet the division condition, it is determined subsequently whether or not a ray on the section selected at the step 112 of FIG. 33 is received at each reception point inside the reception point group ri (steps 713, 115, 116), and if the ray is received, calculation of electrical field strength and propagation delay time is conducted (step 117), and results thereof are stored in the storage region (step 118). The above processing is repeated while successively making the hierarchy of the reception point groups transit at a step 711, and when the sets Ai becomes empty sets at a step 712, namely, when the storage of the elements is never conducted at the step 709 for the set prepared at the step 705, the reception determination processing is finished.

Figure 5:
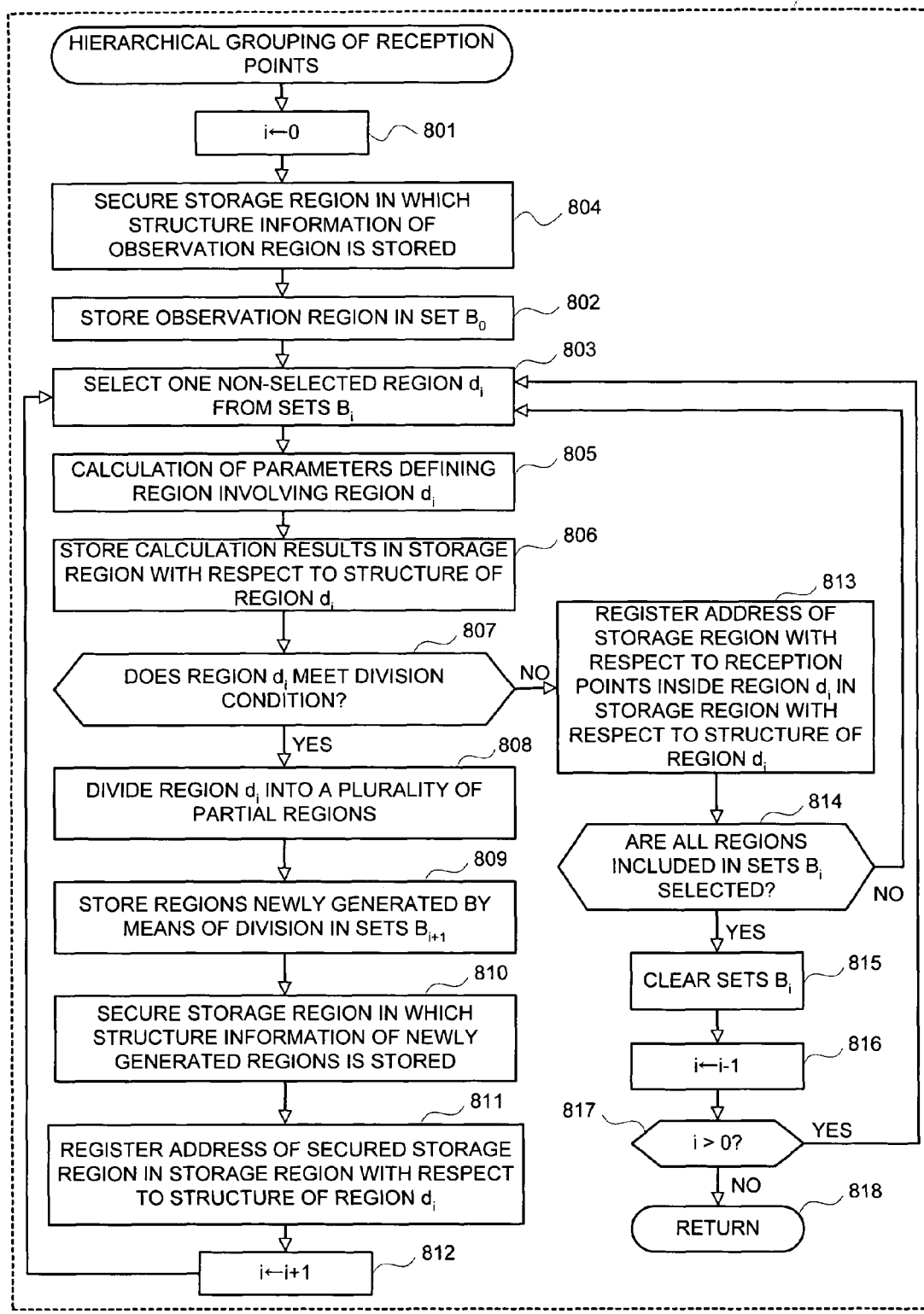
FIG. 5 is a flow chart showing a particular example of an operation of reception point hierarchical grouping in the first embodiment.

FIG. 5 is a flow chart showing one example of an embodiment of the processing (step 701) for dividing the reception points into hierarchical groups to create the structure information D. First, after the internal variable i is set as 0 at a step 801, a storage region for storing the structure information of the observation region is secured at a step 804. Next, working sets Bi (i=0, 1, . . . ) having partial regions inside the observation region as its elements are provided, and after each set is initialized to an empty set, the observation region is stored in B0 (step 802). At a step 803, one non-selected region di is selected from the sets Bi, and parameters which define a region involving the region di are calculated in accordance with a predetermined method (step 805), and a result thereof is stored in the storage region with respect to the structure of the region di (step 806).

At a step 807, it is determined whether or not the selected region di meets a division condition defined in advance, and if the condition is met, the region di is divided into a plurality of partial regions in accordance with a predetermined method (step 808), and the newly generated regions are stored in the sets Bi+1 (step 809). Subsequently, storage regions for storing the structure information of the partial regions are newly secured by the number of the newly generated regions (step 810), and addresses of the secured storage regions are registered in the storage region for storing the structure information of the region di (step 811). Thereafter, at a step 812, a value of i is increased by 1, and the process returns to the step 803.

On the other hand, if it is determined that the region di selected at the step 807 does not meet the division condition, for each reception point included inside the region di, addresses of the storage regions for storing the information of the said reception points are registered in the storage region for storing the structure information of the region di (step 813). Next, at a step 814, it is determined whether or not all elements in the sets Bi have been selected, and if non-selected elements remain, the process returns to the step 803, and if all elements have been selected, the sets Bi are initialized to empty sets (step 815), and a value of the variable i is decreased by 1 (step 816), and if i is greater than 0, the process returns to the step 803, and if i is less than 0, the hierarchical grouping processing of the reception points is finished (step 818).

Figure 6:
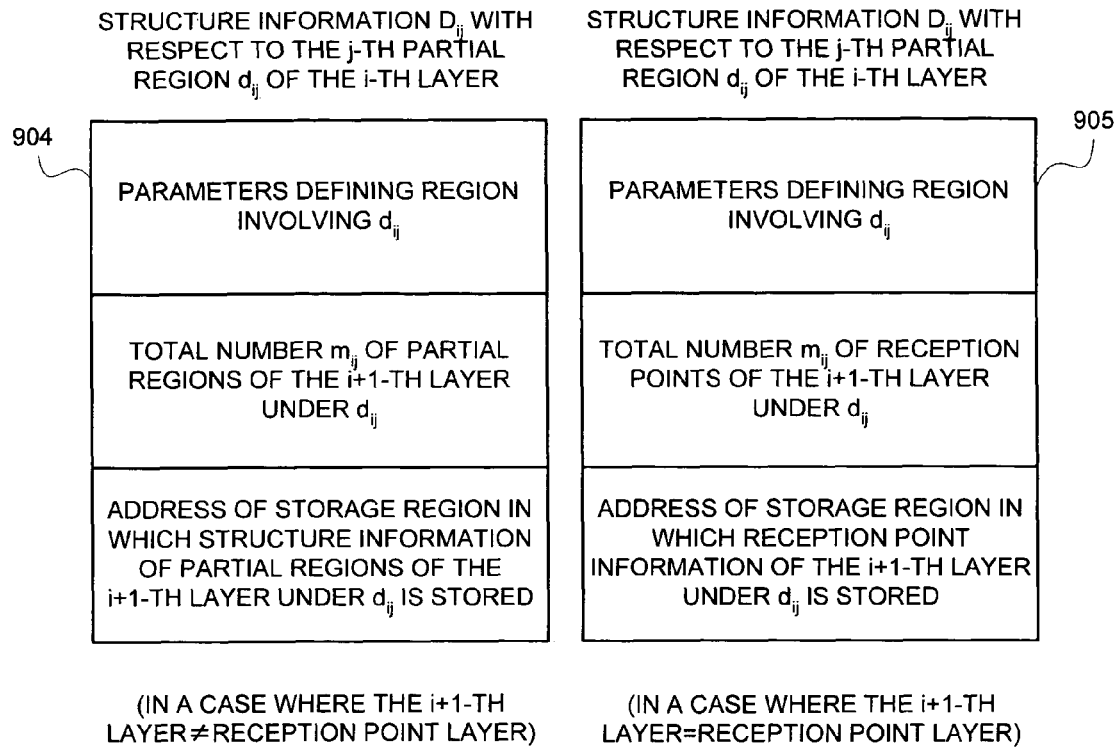
FIG. 6 is a chart showing hierarchical structure information of reception point groups in the first embodiment.

FIG. 6 is a view showing one example of the structure information of the partial regions generated by the reception point hierarchical grouping processing of FIG. 5. Both a chart 904 and a chart 905 shown in FIG. 6 show parameters constituting the structure information Dij with respect to the j-th partial region dij of the i-th layer, which was generated by means of the division, and the chart 904 shows a case where the i+1-th layer is not a layer of the reception point positioned at an end of the hierarchy, and the chart 905 shows a case where the i+1-th layer is a layer of the reception point. The structure information Dij of the chart 904 is constructed of parameters for defining a region involving the j-th partial region dij of the i-th layer, the total number mij of the partial regions of the i+1-th layer under the region dij, and an address group of mij storage regions for storing the structure information of the partial regions of the i+1 layer under the region dij.

Figure 7:
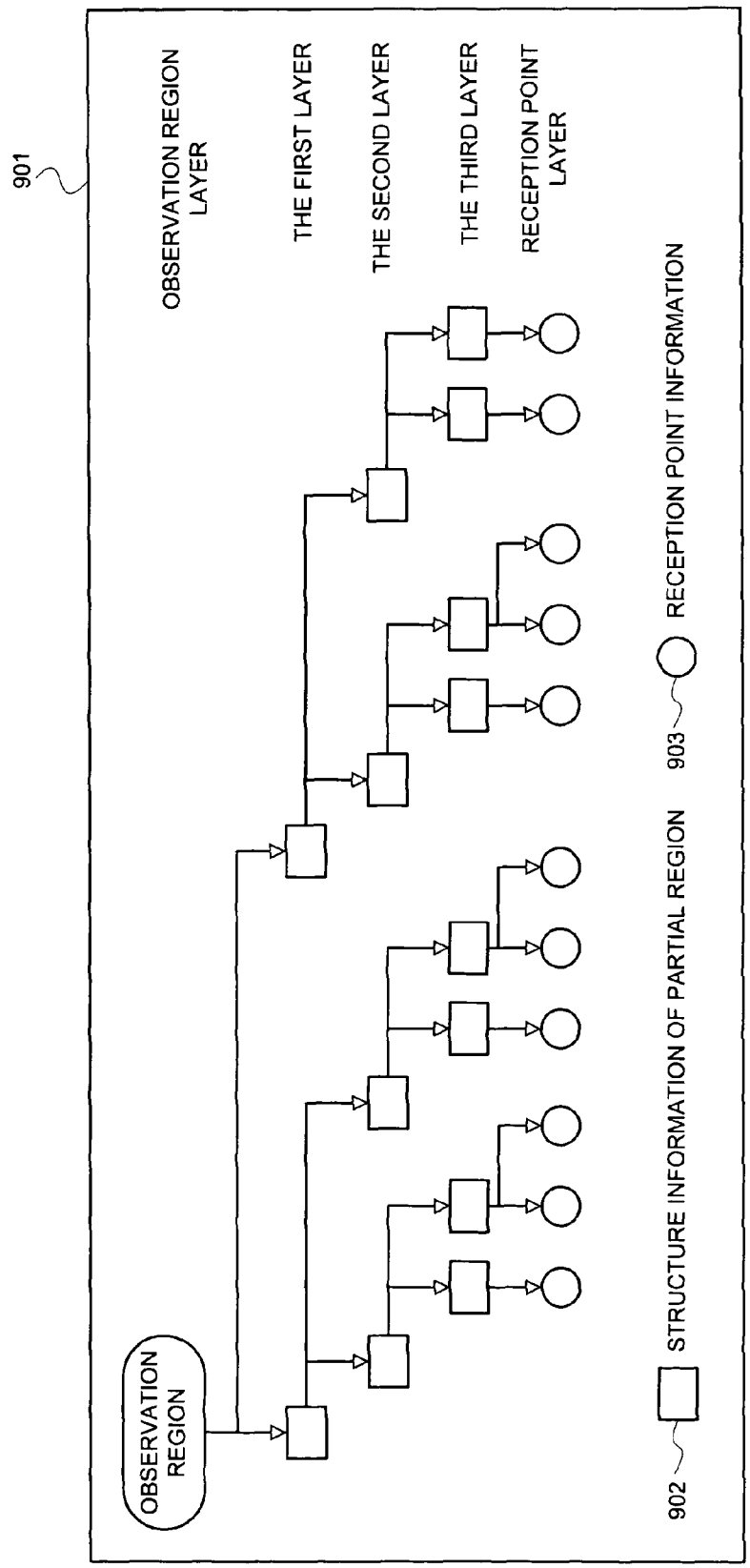
FIG. 7 is a view showing a relationship of information between hierarchical structures of the reception point groups in the first embodiment.

On the other hand, the structure information Dij of the chart 905 is constructed of parameters for defining a region involving the j-th partial region dij of the i-th layer, the total number mij of the reception points of the i+1-th layer under the region dij, and an address group of mij storage regions for storing the reception point information of the i+1-th layer under the region dij. The structure information and the reception point information of the partial regions form a hierarchical structure of the information as shown in a structure 901 of FIG. 7 by registering the addresses of the storage regions for storing the information in the reception point hierarchical grouping processing of FIG. 5.

For a form of the partial regions handled at the step 808 of FIG. 5 and a form of the region involving the partial regions handled at the step 805 of FIG. 5, various candidates can be considered. However, in actual, it is necessary to select a form in which the exclusion determination of the reception point groups at the step 707 of FIG. 4 can be performed efficiently as much as possible. For that, a form of the region involving the partial regions is needed, which can realize the exclusion determination with computational efforts less than those in a case where the exclusion determination is conducted using the partial regions, and the form is needed, in which a difference between the partial regions and the region involving them would be smaller as much as possible. In this manner, there is a mutually restricted relationship between the partial regions and the region involving them. In this embodiment, as the region involving the partial regions, a sphere (circumscribed sphere) involving the partial regions, which has the minimum radius, is used, and a case where a cube is used for the partial regions of the observation region will be explained in detail. In this case, the parameters defining a region of the circumscribed sphere, which are calculated at the step 805, are a center coordinate and a radius of the circumscribed sphere.

Figure 8:
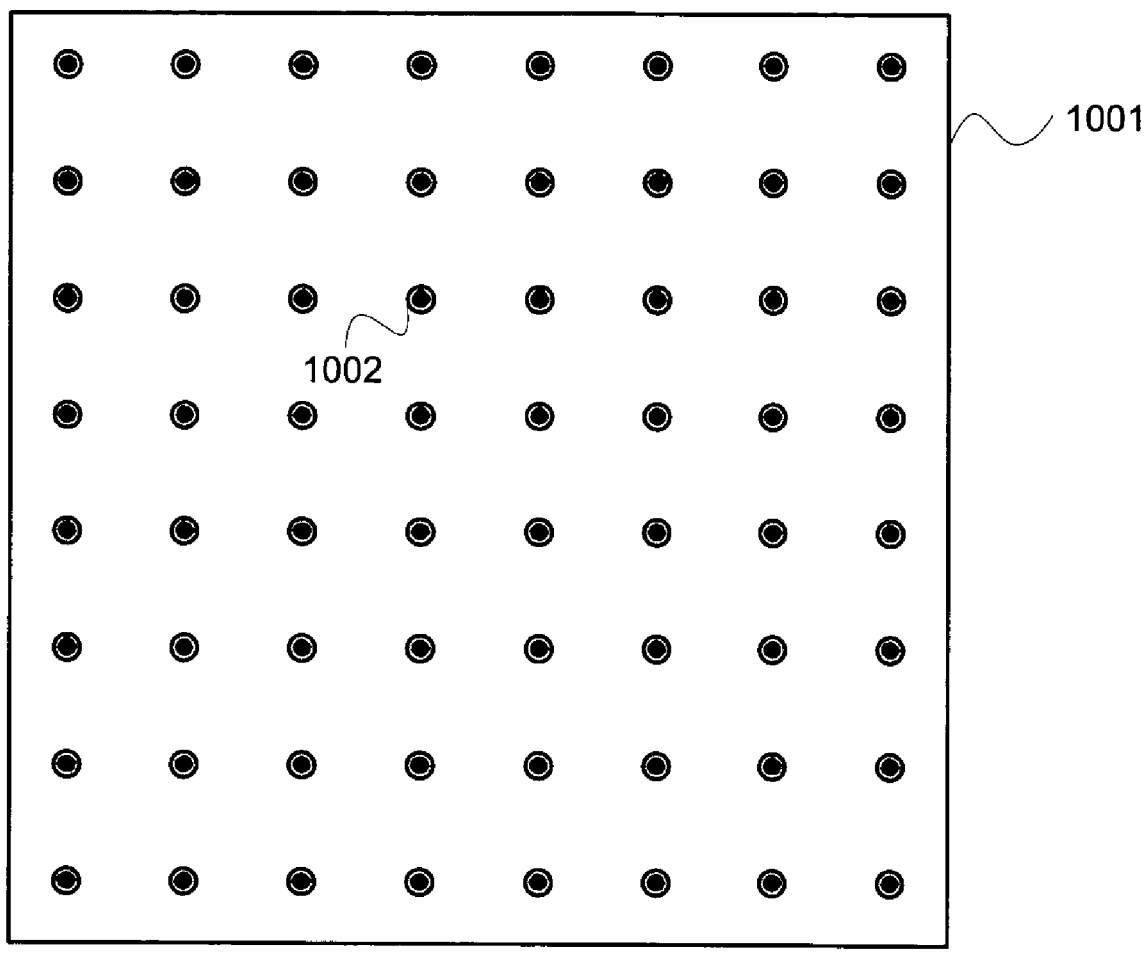
FIG. 8 is a view showing an observation region (a square) in the first embodiment.

First, as one example of algorithm for dividing the region into a plurality of the partial regions at the step 808 of FIG. 5, a case where, as shown in FIG. 8, reception points 1002 are arranged in the lattice shape on a planar region 1001 that is a horizontal cross section of the observation region will be explained in detail. However, to facilitate understanding thereof, initially assuming that a shape formed by lattice points that stand in line on a most outer side inside the region 1001 is a square, and the explanation is restricted to a case which is represented by a form in which the number of the reception points (most external contour reception points, hereinafter) standing in line on one side of the square is $2^n$ (n is a positive integer including 0). In this case, the original region is divided into four square regions having a area same as each other.

Figure 9:
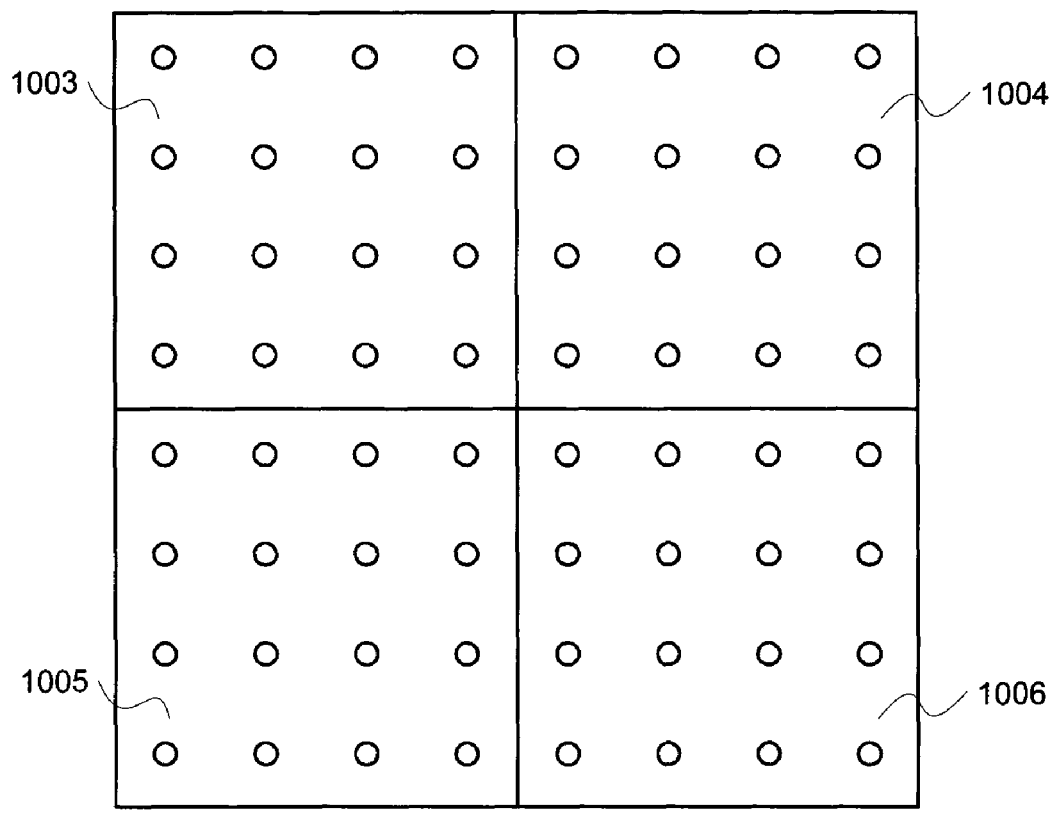
FIG. 9 is a view explaining a division process of the first layer of the reception point groups in the first embodiment.
Figure 10:
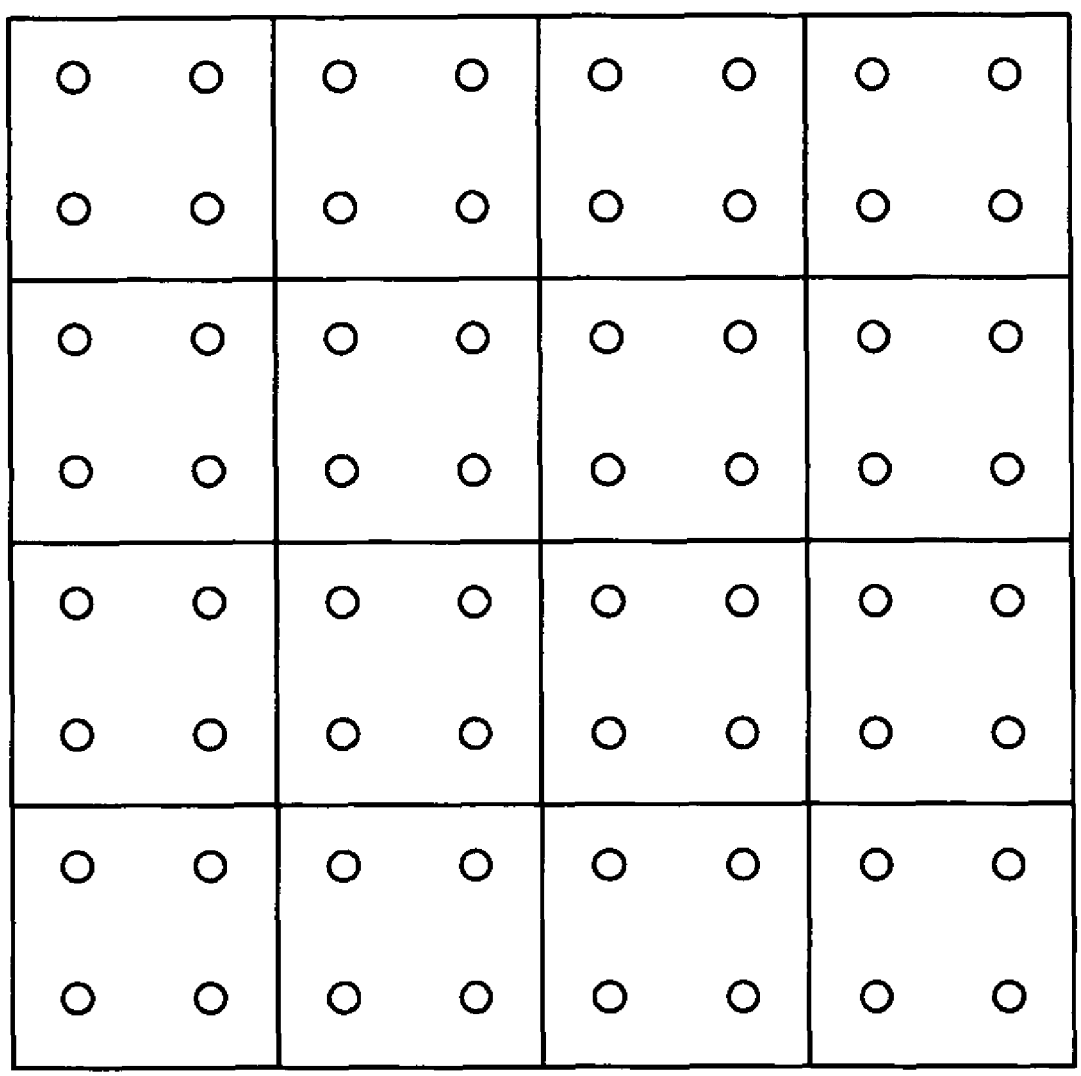
FIG. 10 is a view explaining a division process of the second layer of the reception point groups in the first embodiment.
Figure 11:
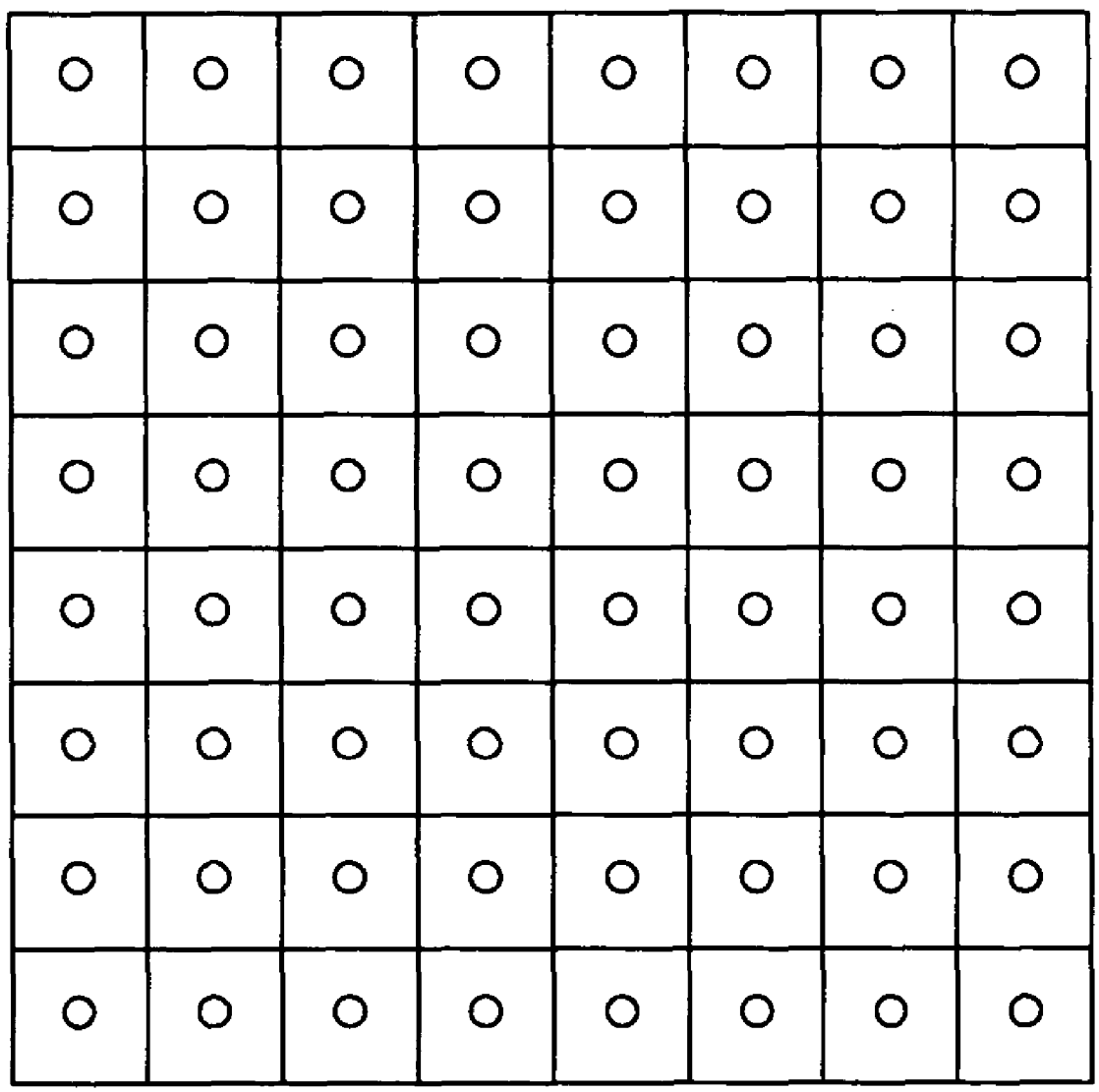
FIG. 11 is a view explaining a division process of the third layer of the reception point groups in the first embodiment.

For example, in a case of FIG. 8, since the number of the most external contour reception points is 8 ($=2^3$), the region is divided into partial regions like in FIG. 9 by means of four square regions (a region 1003-a region 1006) in which the number of the most external contour reception points is 4 ($=2^2$). Four reception point groups just belonging to the observation region, which is grouped by the four partial regions generated in this manner, are reception point groups of the first layer. Hereinafter, similarly, each partial region of FIG. 9 is divided into reception point groups of the second layer like in FIG. 10, and the division processing is finished when only one reception point would be included inside the partial regions finally (FIG. 11).

Figure 12:
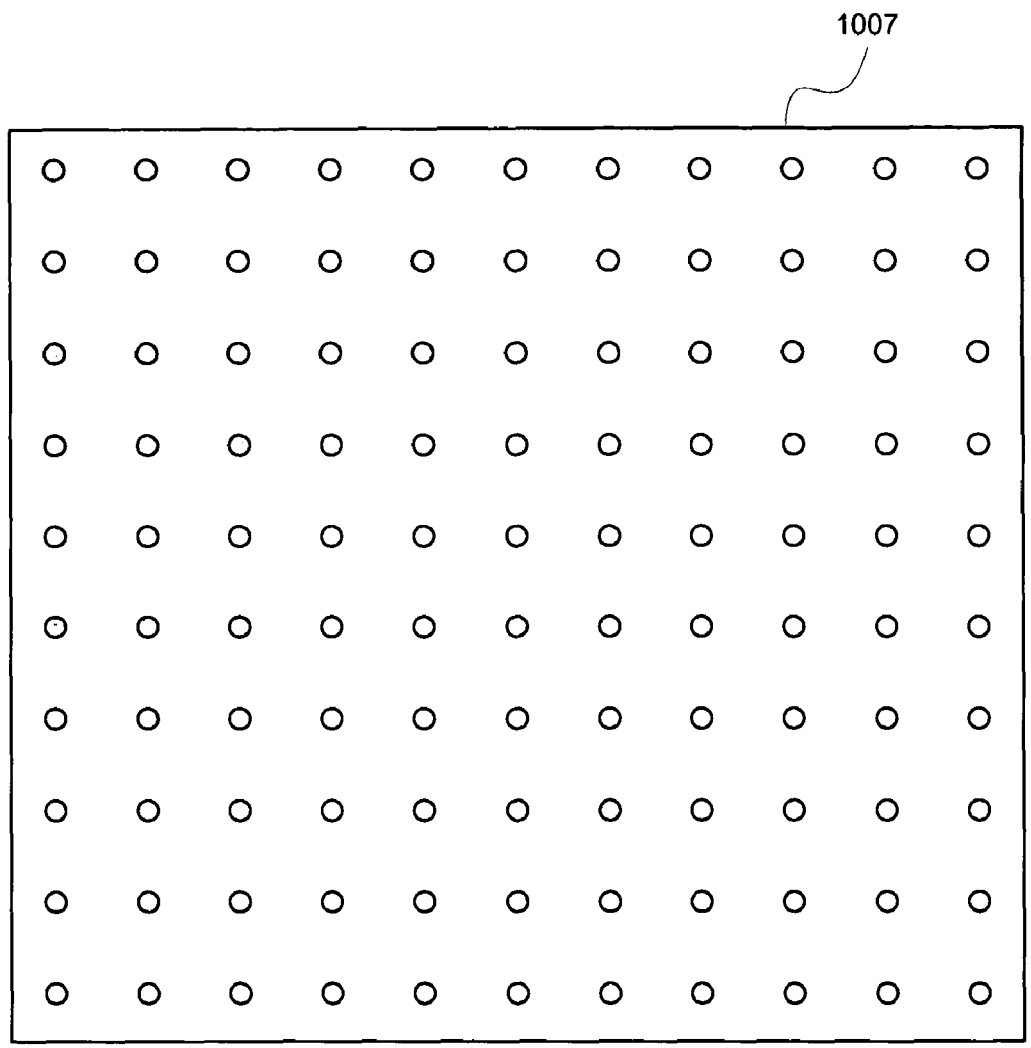
FIG. 12 is a view showing an observation region (a rectangle) in the first embodiment.

Next, as a more general case, region division in which, like in FIG. 12, a shape formed by the lattice points that stand in line on a most outer side inside a horizontal cross sectional region 1007 of the observation region is a rectangle will be mentioned. At this time, the most external contour reception points are defined, respectively, for two sides forming the rectangle, and both the numbers thereof can take an arbitrary integer equal to or more than 1.

Figure 13:
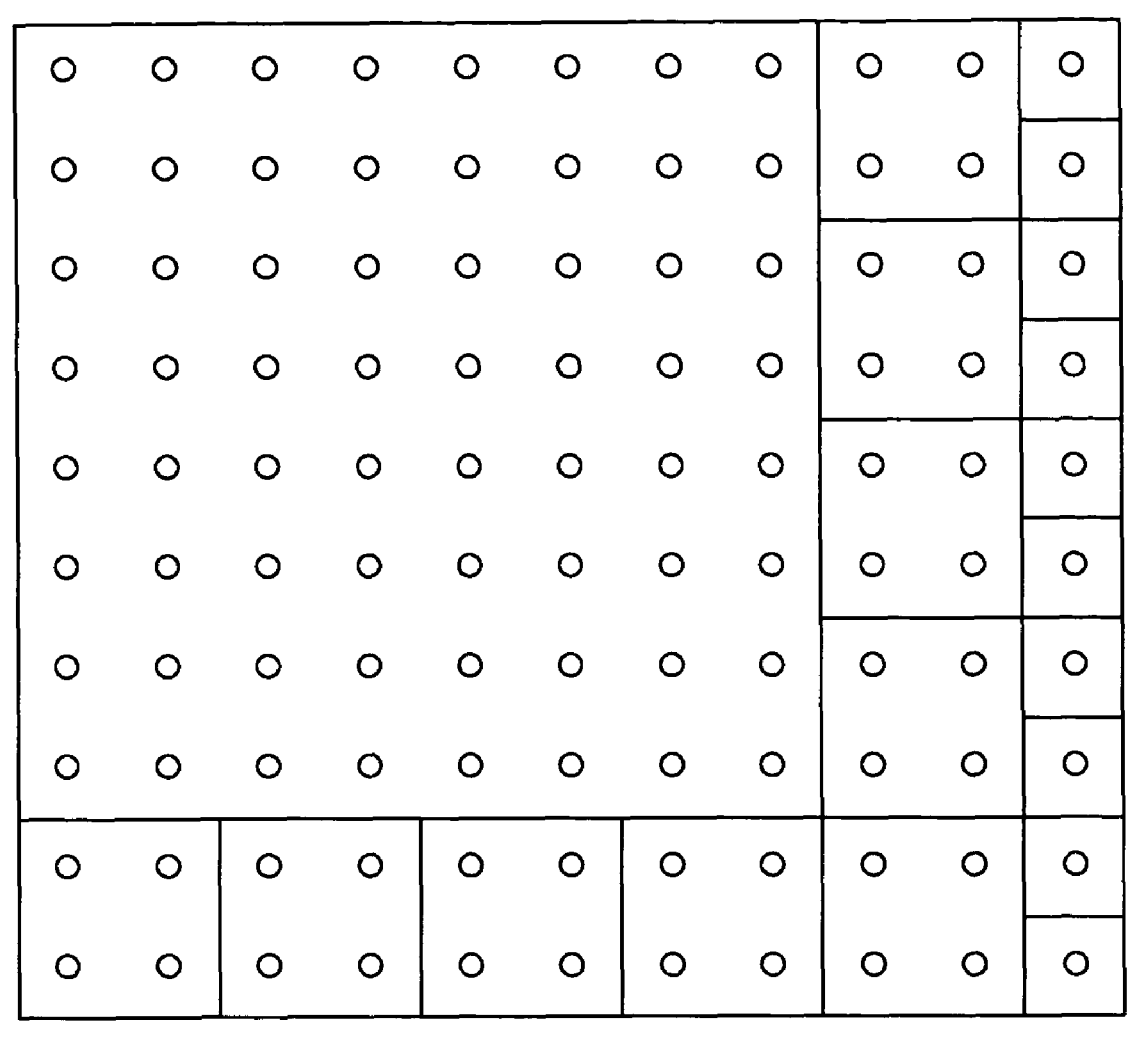

In this case, first, the number of the most external contour reception points is resolved into a sum of $2^n$ (n is a positive integer including 0). For example, in a case of FIG. 12, since the numbers of the most external contour reception points are 10 and 11, they can be resolved into $10=2^3+2^1$ and $11=2^3+2^1+2^0$, respectively. Next, from each factor (in a case of this example, three kinds of $2^3$, $2^1$, $2^0$) of $2^n$ generated by means of the resolution, square regions in which these factors are the numbers of the most external contour reception points are generated. Thereafter, if the generated square regions are spread in order from the upper-left of the region so that the square regions having a greater area are spread as much as possible, the observation region can be divided like in FIG. 13. In case that the horizontal cross section of the observation region is a rectangle, the reception point groups grouped by each square region in this manner are reception point group of the first layer.

Figure 14:
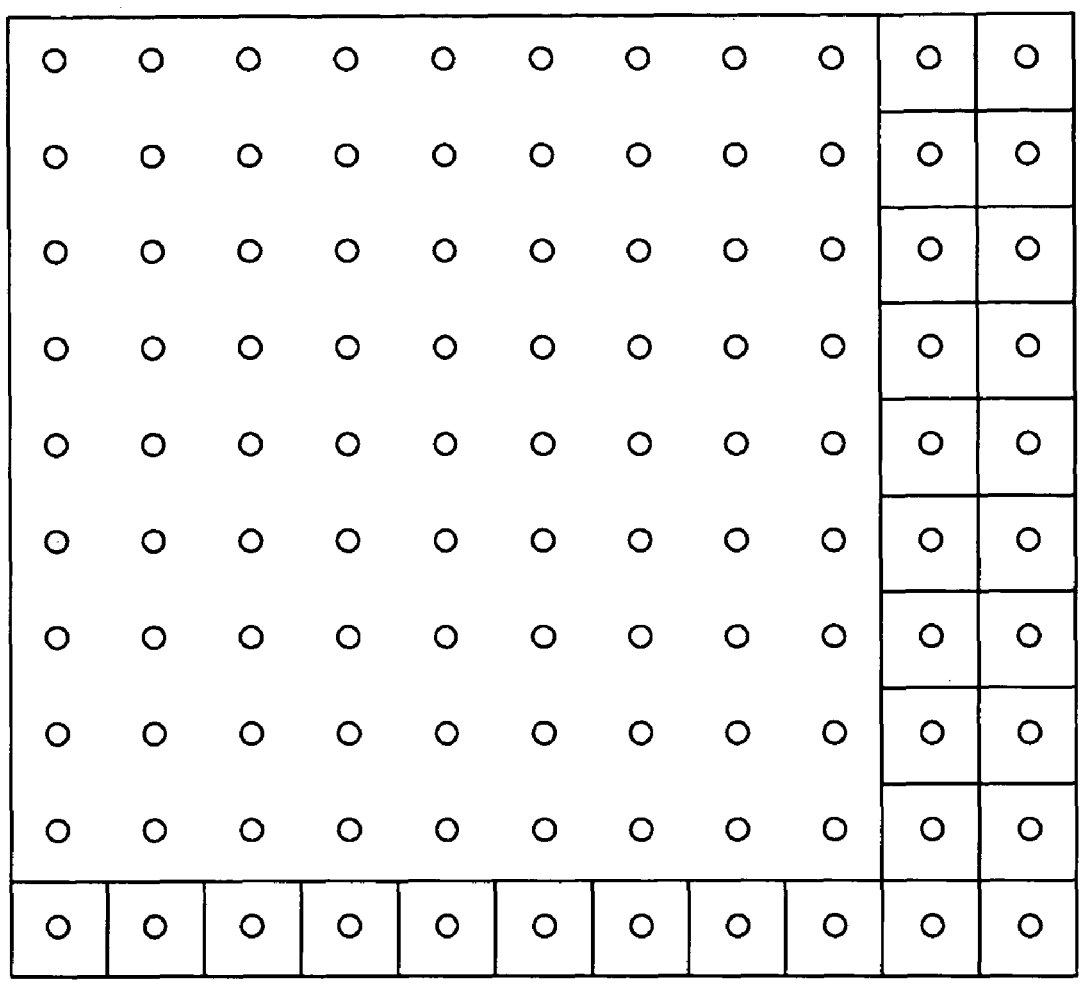
FIG. 14 is a view explaining a different method of the division process of the first layer of the reception point groups in the first embodiment (in a case where the observation region is a rectangle)
Figure 15:
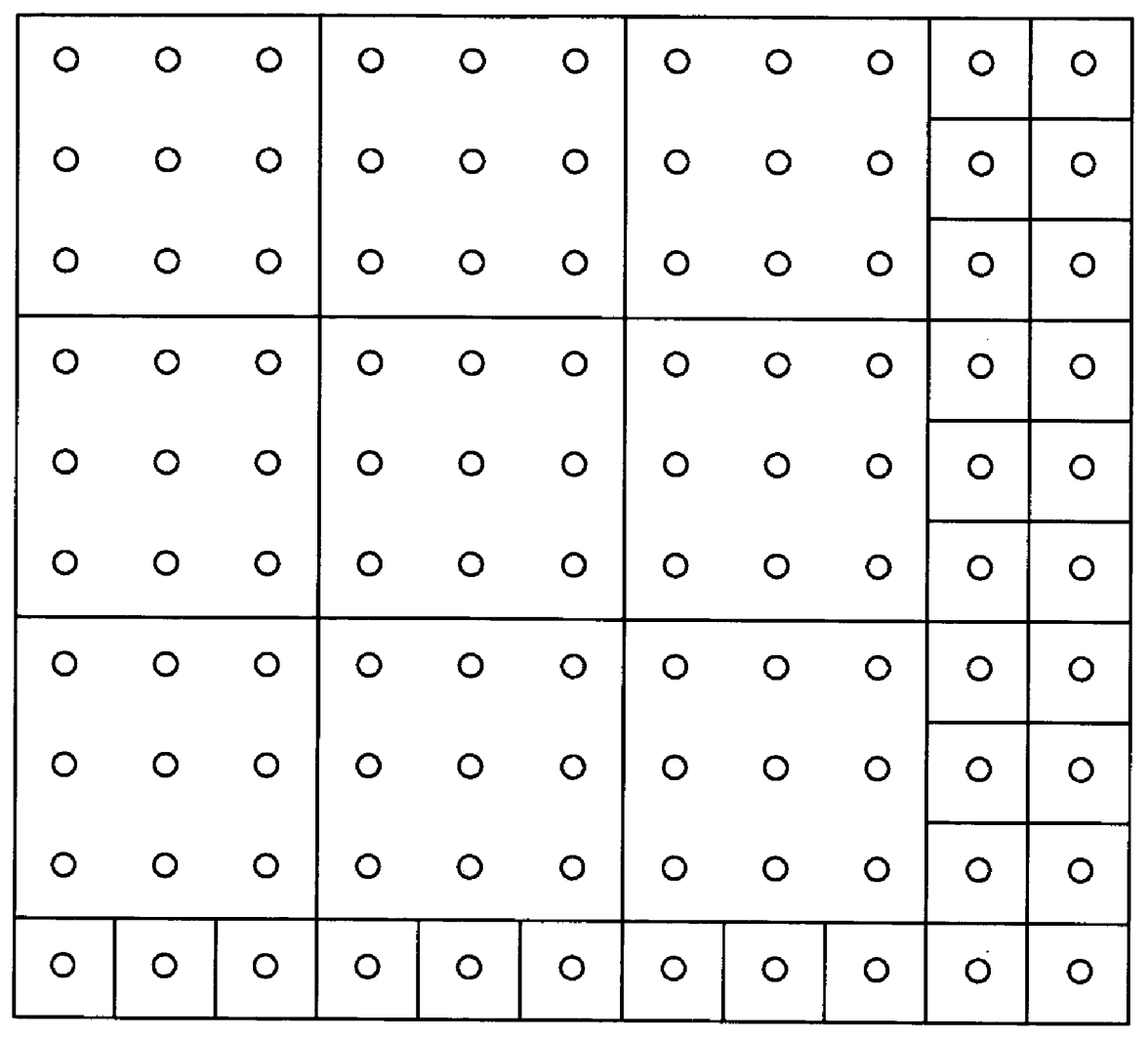

Since each region defining the reception point groups of the first layer, which were generated in this manner, are square regions in which the number of the most external contour reception points is $2^n$, the region division for layers from the second down to others can be performed successively in accordance with the method mentioned for a case where the horizontal cross section of the observation region is a square. The above-described method in which the number of the most external contour reception points is resolved into a sum of $2^n$ can be more generally extended to a method of resolving it into a sum of $a^n$ (a is an integer equal to or more than 1, n is a positive integer including 0). For example, in case of a=3, the region 1007 of FIG. 12 can be divided into the reception point groups of the first layer like FIG. 14, and further, can be divided into the reception point groups of the second layer like in FIG. 15. However, since, in FIG. 14, the reception point groups which include only a single reception point inside cannot be divided any more, in FIG. 15, only the reception point groups which include 9 reception points inside become the reception point groups of the second layer.

Figure 16:
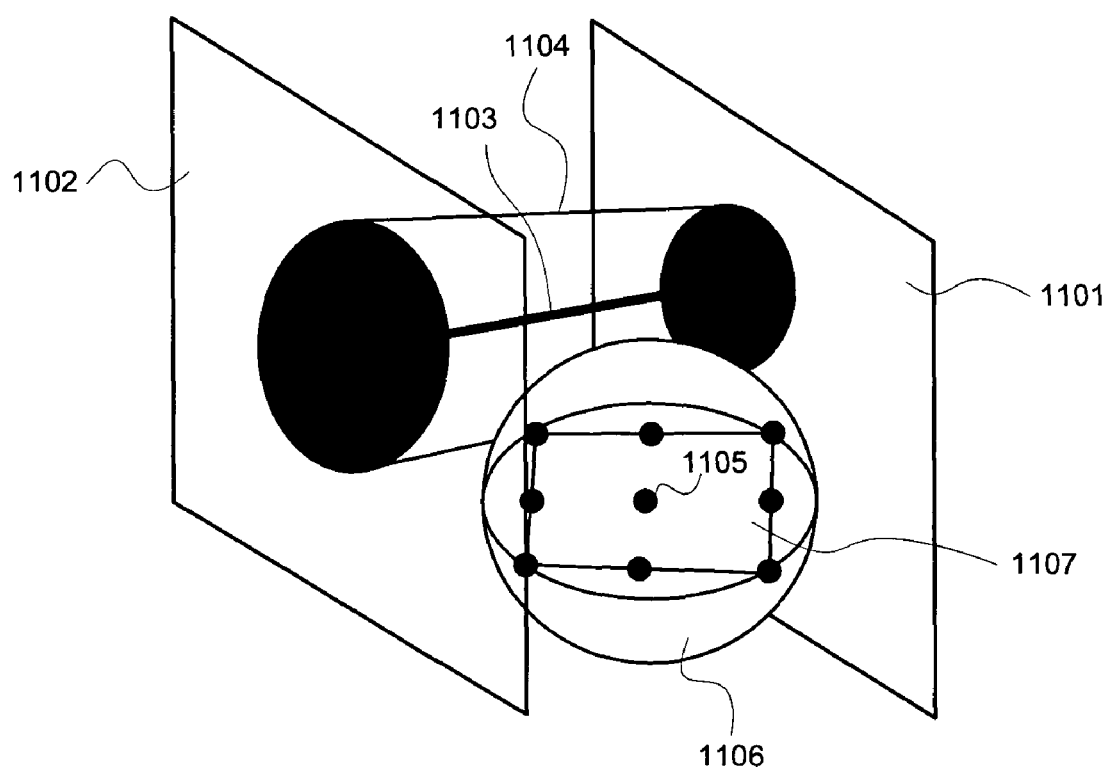
FIG. 16 is a view explaining exclusion determination of the reception point groups using a circumscribed sphere in the first embodiment.

FIG. 16 is a view for explaining one example of the determination (step 707) on whether or not the reception point groups selected at the step 706 are continuously held as a subject of the reception determination. In the conventional method, the reception determination is conducted by means of whether or not one reception point is included in a region defined in the vicinity of a ray. In this processing, since, in accordance with the method of the Non-Patent Publication 3 for example, it comes down to inclusive determination of a circular cone and a point, the determination can be made based on a magnitude relation between a radius of a cross sectional circle in case of cutting the circular cone by a plane which includes the reception points and in which a ray is a normal line, and an altitude between the reception point and the ray.

On the other hand, in the launching method in accordance with the present invention, it is necessary to conduct intersection determination of the region defined in the vicinity of the ray and the region defining the reception point groups before conducting the inclusive determination of the region defined in the vicinity of the ray and the reception points. Since this determination is intersection determination of two regions in a three-dimensional space, compared with the conventional method that requires only distance determination of a point and a line, the handling thereof is difficult. Further, in order to accomplish the speeding-up of the reception determination, a calculation load required for this intersection determination must be less than the total sum of calculation loads in a case where the determination of the step 115 is conducted for all reception points included in the reception point groups.

Figure 39:
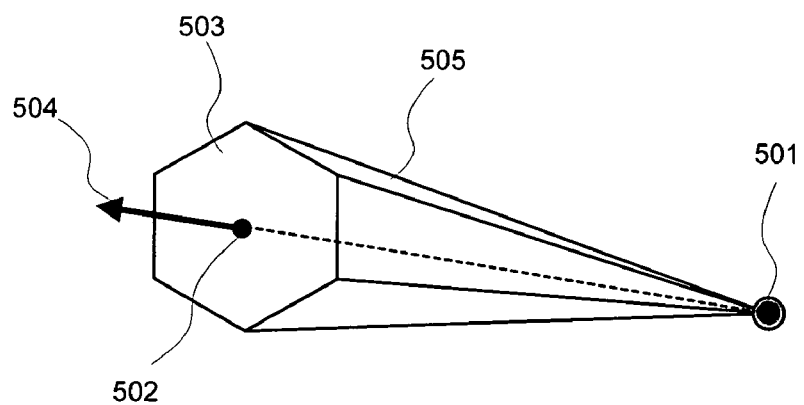
FIG. 39 is a view explaining a prior art for generating a ray set to be radiated from a transmission point.

In this embodiment, referring to the drawings, a case where a circumscribed sphere is utilized for the intersection determination of the region defined in the vicinity of the ray and the region defining the reception point groups will be explained in detail. FIG. 16 is a view explaining the determination of the step 707, in which a circumscribed sphere is utilized. A plane 1101 and a plane 1102 are barriers installed inside the observation region, and an aspect is shown, in which a ray 1103 passes through the plane 1101 or is reflected at the plane 1101, and enters the plane 1102. In the vicinity of the ray 1103, as shown in FIG. 39, a region in which a cross section perpendicular to the ray is a polygon is defined, and in FIG. 16, a part (partial circular cone) 1104 of a circular cone circumscribed with this region is shown. In a region 1107 defining the reception point groups, a circumscribed sphere 1106 having a point 1105 as a center is provided, and by adopting such an arrangement, the determination of the step 707 can come down to intersection determination of the circumscribed sphere 1106 and the partial circular cone 1104. In other words, in case that the circumscribed sphere 1106 does not intersect with the partial circular cone 1104, since the reception points inside the region 1107 are never involved in the partial circular cone 1104, in such a case, the reception point groups defined by the region 1107 are excluded at the step 707.

Figure 17:
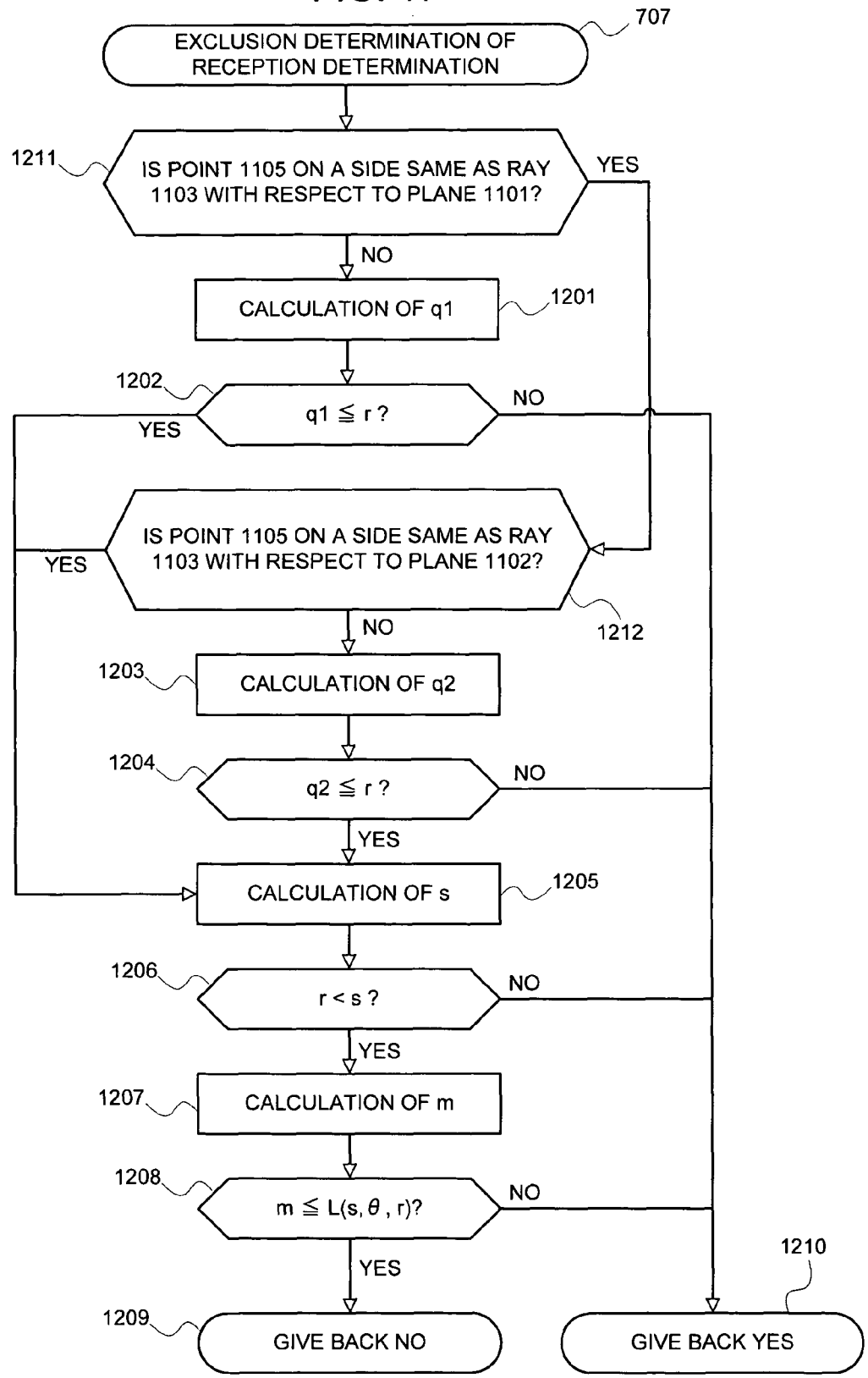
FIG. 17 is a flow chart explaining an operation of the exclusion determination of the reception point groups in the first embodiment.
Figure 18:
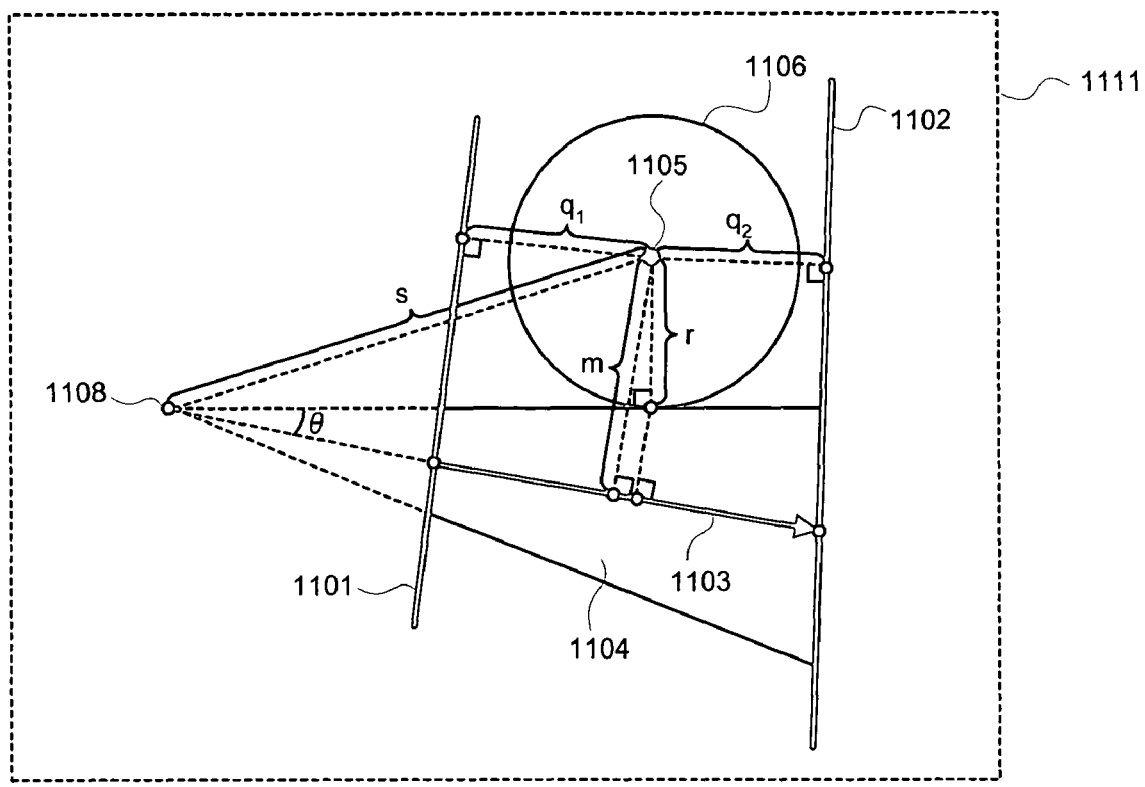
FIG. 18 is a view explaining a principle of the exclusion determination of the reception point groups in the first embodiment.

Referring to the drawings, the determination of the step 707 in case of using the circumscribed sphere will be explained in detail below. The intersection determination of the partial circular cone 1104 and the circumscribed sphere 1106 can be divided into two steps of intersection determination of a region sandwiched between an infinite plane including the plane 1101 and an infinite plane including the plane 1102, and the circumscribed sphere 1106, and intersection determination of a circular cone circumscribed with the partial circular cone 1104 and the circumscribed sphere 1106. With regard to an order of the intersection determination, in order to be able to exclude the reception point groups as much as possible, which can be excluded, by means of the determination, calculation load of which is smaller, initially the intersection determination with the region sandwiched between the infinite plane including the plane 1101 and the infinite plane including the plane 1102 is conducted, and later, the intersection determination of the circular cone circumscribed with the partial circular cone 1104 and the circumscribed sphere 1106 is conducted. FIG. 17 is a flow chart showing this determination processing. Further, FIG. 18 is a view explaining a determination principle thereof, and shows a cross section in which the partial circular cone 1104 and the circumscribed sphere 1106 are cut by a plane 1111 passing through the center 1105 of the circumscribed sphere, out of planes including the ray 1103.

In the processing of FIG. 17, first, to conduct the intersection determination of the region sandwiched between the infinite plane including the plane 1101 and the infinite plane including the plane 1102, and the circumscribed sphere 1106, it is determined whether or not the center 1105 of the circumscribed sphere is located on a side same as the ray 1103 with respect to the infinite plane including the plane 1101 (step 1211). If it is determined that it is located on the same side, similarly it is determined whether or not the center 1105 of the circumscribed sphere is located on a side same as the ray 1103 with respect to the infinite plane including the plane 1102 (step 1212), and if it is also determined here that it is located on the same side, the process moves to a step 1205.

If it is determined at the step 1211 that it is not located on the same side, an altitude q1 between the center 1105 of the circumscribed sphere and the infinite plane including the plane 1101 is calculated (step 1201), and a radius r of the circumscribed sphere is retrieved from the storage region of the hierarchical structure information of the reception point groups, which was generated at the step 701 of FIG. 3, and a magnitude relation between q1 and r is compared (step 1202). In case that q1 is larger than r, a value YES is given back as a determination result of the exclusion determination (step 1210), and in case that q1 is equal to or less than r, the process moves to the step 1205.

If it is determined at the step 1212 that it is not located on the same side, an altitude q2 between the center 1105 of the circumscribed sphere and the infinite plane including the plane 1102 is calculated (step 1203), and a radius r of the circumscribed sphere is retrieved from the storage region of the generated hierarchical structure information of the reception point groups, and a magnitude relation between q2 and r is compared (step 1204). In case that q2 is larger than r, a value YES is given back as a determination result of the exclusion determination (step 1210), and in case that q2 is equal to or less than r, the process moves to the step 1205.

At the step 1205, a distance s between an apex 1108 of the circular cone circumscribed with the partial circular cone 1104 and the center 1105 of the circumscribed sphere is calculated, and a magnitude relation with the radius r is compared (step 1206). In case that s is less than r, a value YES is given back as a determination result (step 1210), and in case that s is larger than r, an altitude m between the center 1105 of the circumscribed sphere and the ray 1103 is calculated (step 1207).

Here, since a value of m in a case where the circumscribed sphere 1106 is circumscribed with the partial circular cone 1104 can be calculated by using a function L(s, θ, r) of the following equation:

$$L(s, \theta, r) = r \cos\theta + (s^2 - r^2)^{1/2} \sin\theta \quad (7)$$

by comparing a magnitude relation between m and a value of the function L(s, θ, r), the intersection determination of the circumscribed sphere and the partial circular cone can be conducted (steps 1208, 1209, 1210). However, the parameter θ is an angle between a center axis and a generatrix of the circumscribed circular cone, and this can be obtained from a radiation angle interval of adjacent rays.

Since this exclusion determination method is mainly constructed of simple calculation of distance calculation of a point and a straight line or a point and a plane, and since only a center point of the circumscribed sphere is a calculation subject of the distance determination, it has a feature that a calculation load required for the determination can be suppressed. Further, this exclusion determination method has a feature that wasteful calculation is omitted by finishing the determination of an event as early as possible, in which the value YES is given back, based on stepped determination by means of the steps 1202, 1204, 1206 and 1208.

Figure 19:
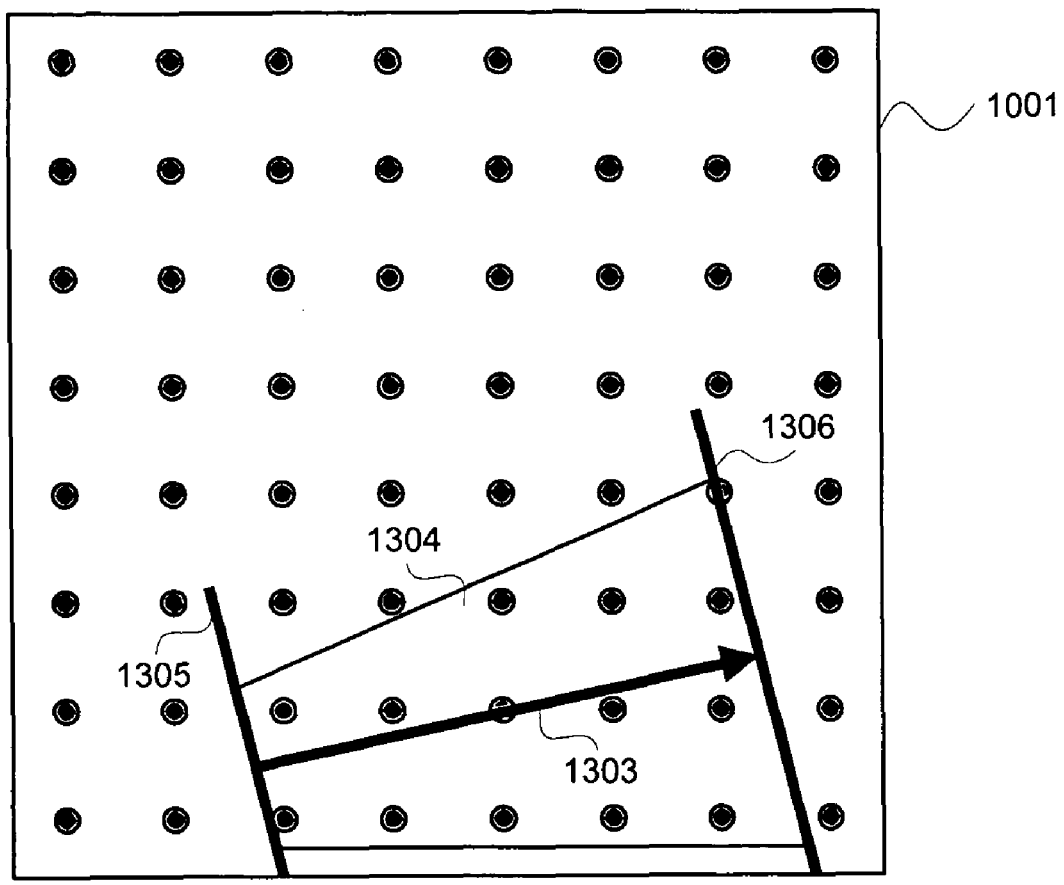
FIG. 19 is a view explaining a particular operation of reception determination processing in the first embodiment.

Referring to the drawings, an operation of the reception determination processing of the present invention in a case where the above-described hierarchical grouping method with respect to the reception point groups, and the exclusion determination method of the above-described reception point groups by means of the circumscribed sphere are used, will be explained particularly. FIG. 19 is a view explaining the operation of the reception determination processing of the present invention in a case where the reception points are arranged in the shape of lattice in the planar region 1001. In addition, this figure shows a case in which a ray 1303 propagates on the plane 1001, and passes through or is reflected at a barrier 1305 to enter a barrier 1306. A region 1304 is a cross section by means of the plane 1001 of the partial circular cone, which is created by cutting a circular cone having the ray 1303 as a center axis by means of the barrier 1305 and the barrier 1306.

Figure 20:
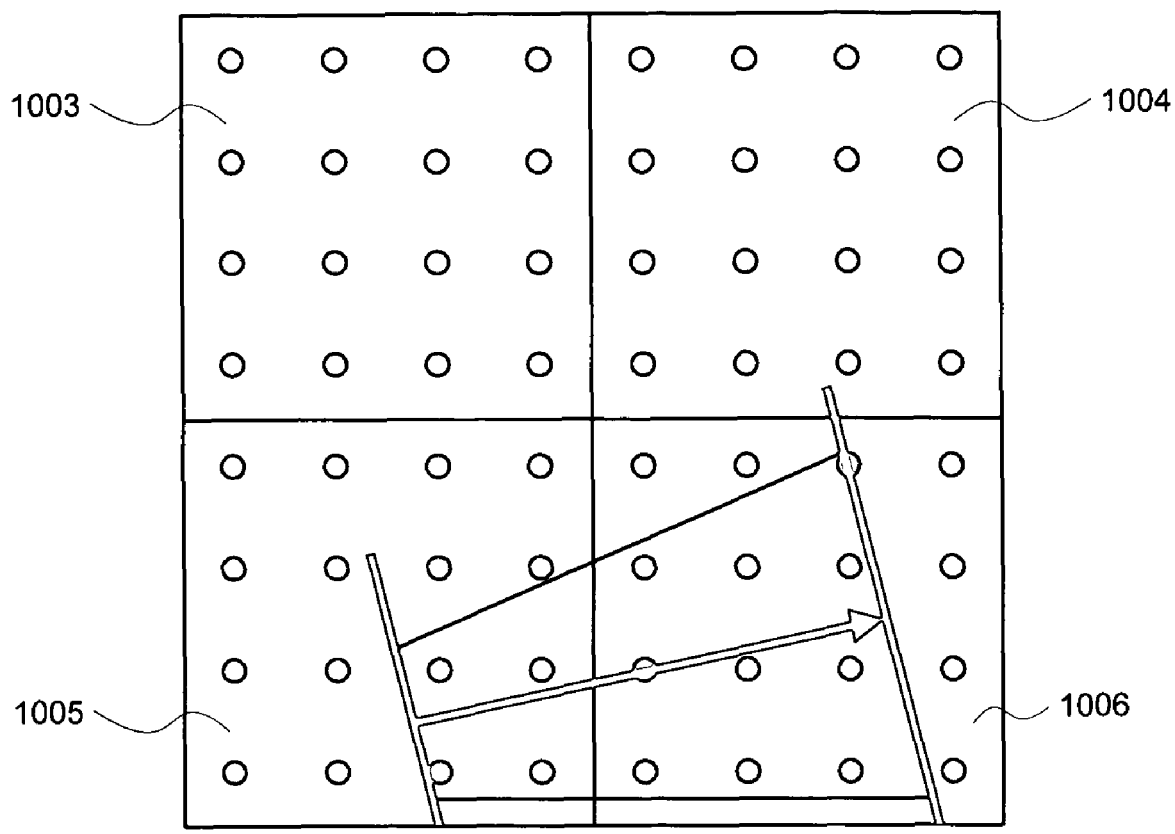
FIG. 20 is a view explaining a particular operation of the reception determination processing in the first embodiment.
Figure 21:
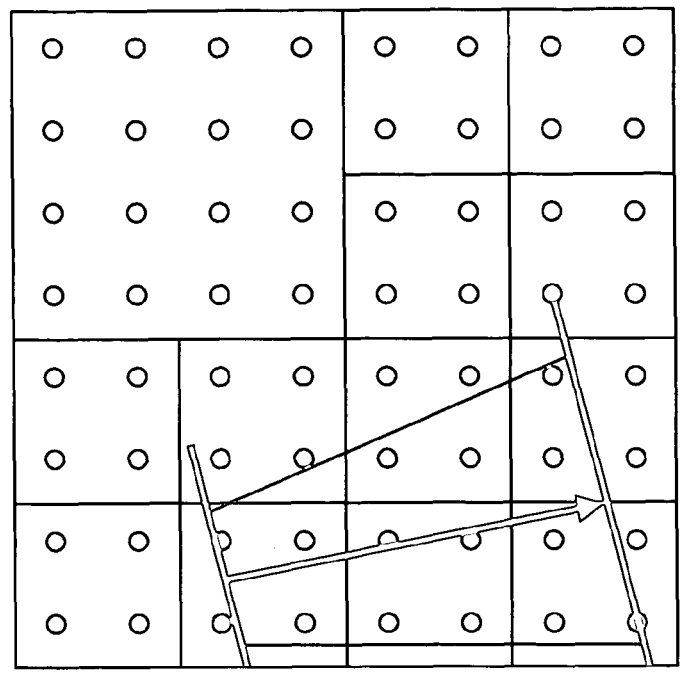
FIG. 21 is a view explaining a particular operation of the reception determination processing in the first embodiment.

In accordance with the method of the present invention, first, the planar region 1001 is divided into regions 1003-1006 for defining the reception point groups of the first layer, and the exclusion determination is applied to each corresponding reception point group (FIG. 20). The reception point groups defined by the region 1003 are excluded since they meet the exclusion condition, and since the reception point groups defined by the regions 1004-1006 do not meet the exclusion condition, after they are divided into the reception point groups of the second layer, the exclusion determination is applied thereto again (FIG. 21). In addition, in this figure, the excluded reception points are shown by outline circles on a white background, and the reception points during reception determination are shown by circles in gray.

Figure 22:
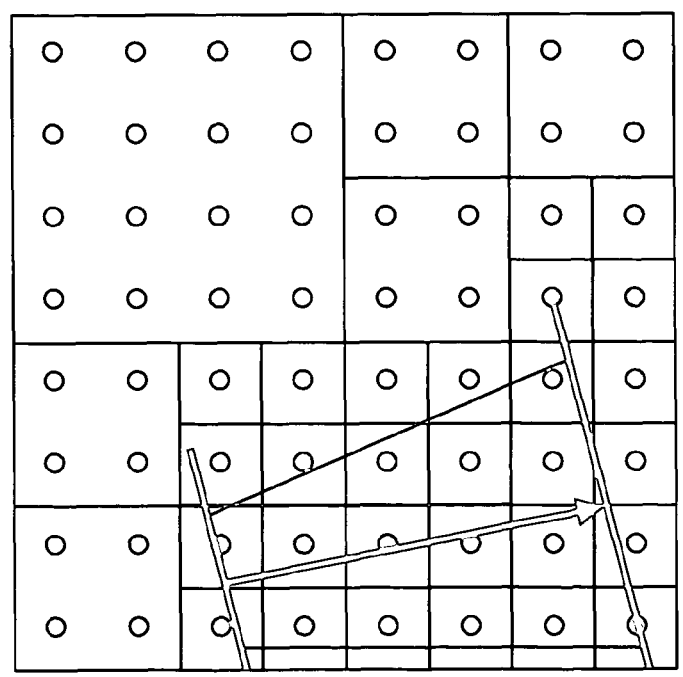
FIG. 22 is a view explaining a particular operation of the reception determination processing in the first embodiment.
Figure 23:
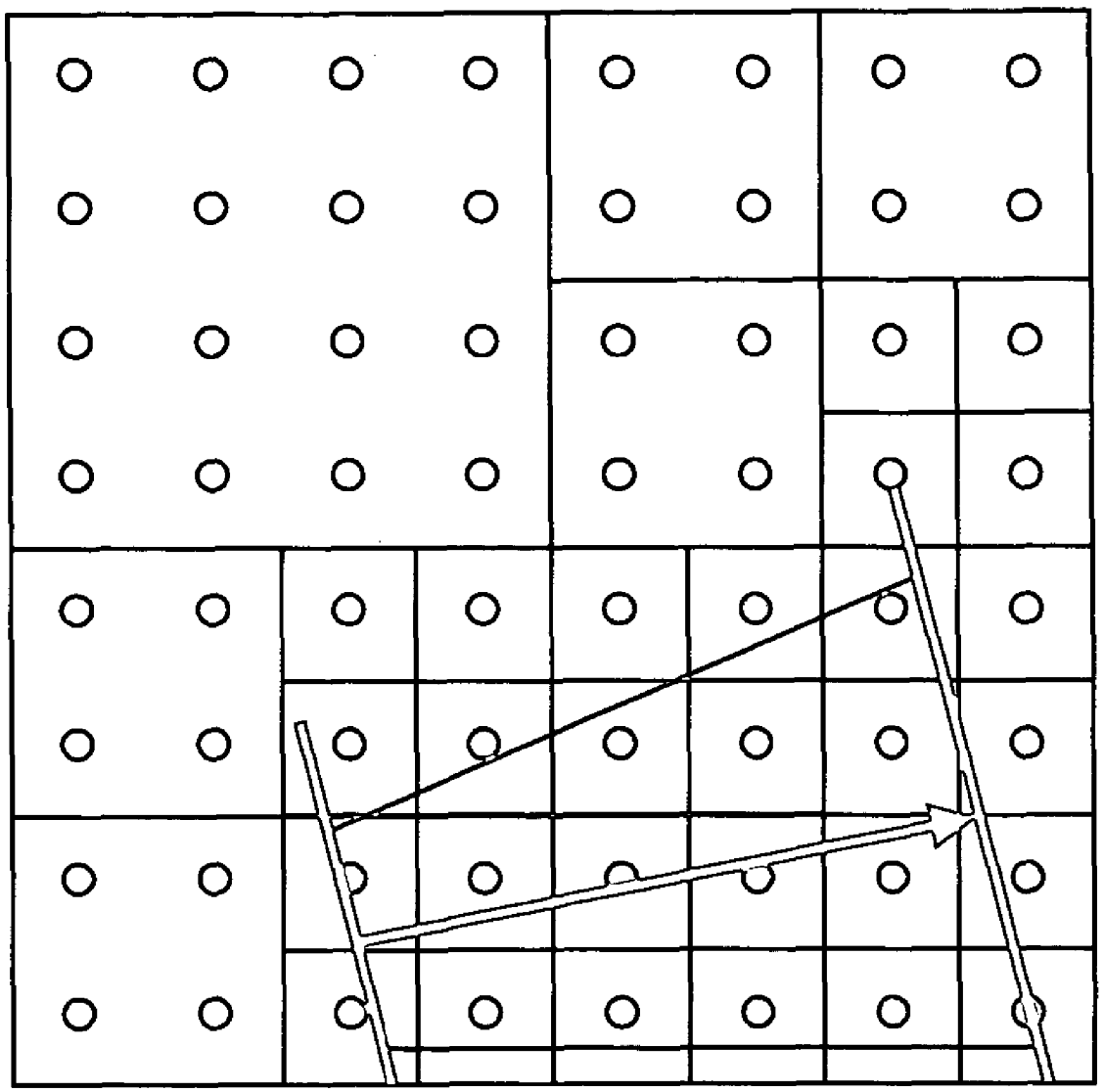
FIG. 23 is a view explaining a particular operation of the reception determination processing in the first embodiment.
Figure 24:
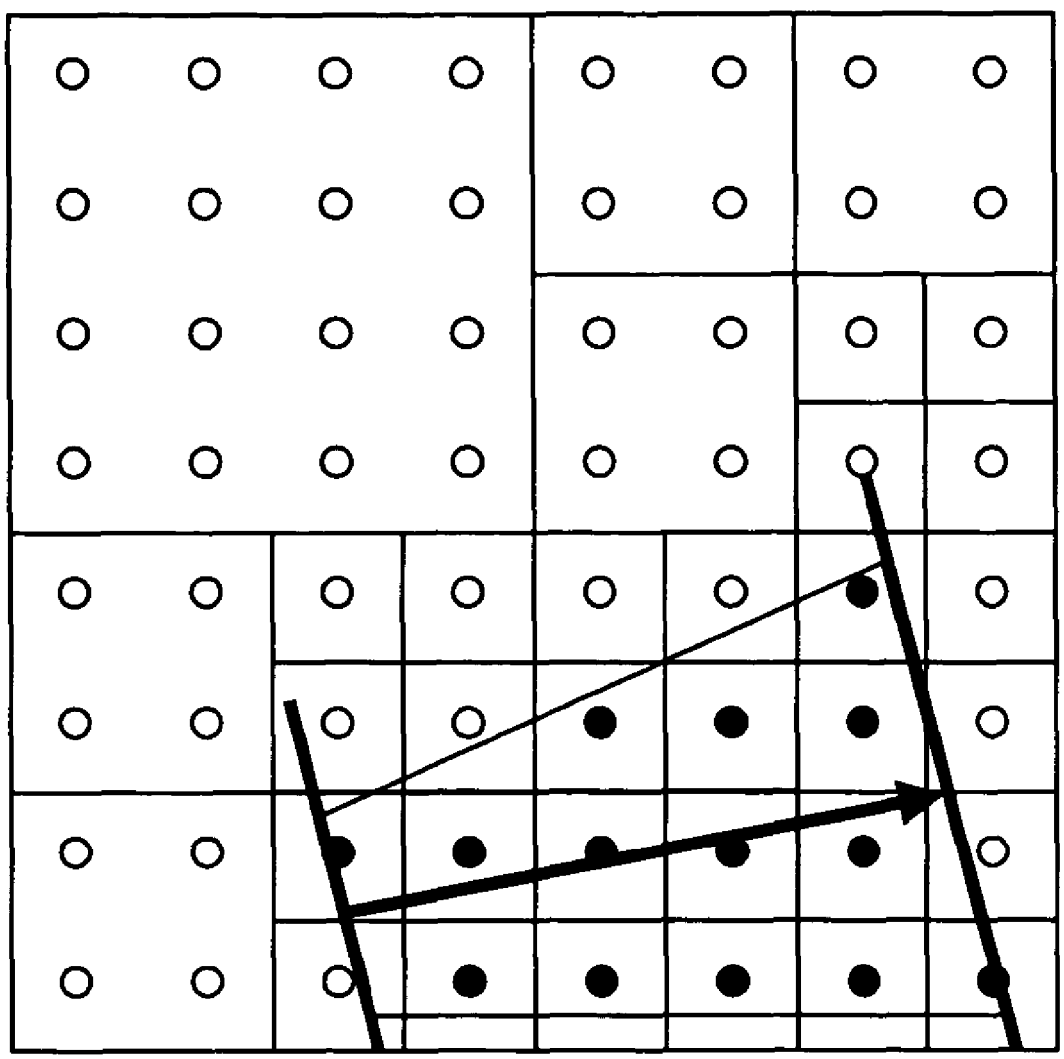
FIG. 24 is a view explaining a particular operation of the reception determination processing in the first embodiment.

After, out of the reception point groups of the second layer, the reception point groups which do not meet the exclusion condition are further divided into the reception point groups of the third layer, the exclusion determination is applied thereto again (FIG. 22). In a case of this example, since only one reception point is included in the reception point groups of the third layer, they are not divided into the reception point groups of the fourth layer, and the reception determination of the step 115 is applied to whole reception points within the reception point groups, which do not meet the exclusion condition for the reception point groups of the third layer (FIG. 23). By means of the above processing, all of the reception points included in the region 1304 are extracted (FIG. 24). As is clear from this operation example, if the reception determination processing in accordance with the present invention is used, since the reception points which are not included in the region 1304 can be collectively excluded by a reception point group unit by means of the simple determination, compared with the conventional method, a calculation load required for the determination can be kept small.

Next, referring to the drawings, a second embodiment of the present invention will be explained. In the first embodiment, as one example of the division condition for the reception point groups at the step 708, the condition that whether or not the reception point groups include a plurality of reception points during the determination of the step 708 was raised. On the contrary, in the second embodiment, in case that it is determined whether or not the reception point groups are divided, in consideration of a calculation efficiency of the entire reception determination processing, a cost function g(·) defined in advance is newly introduced.

The efficiency of the reception determination processing in accordance with the present invention can be approximately understood from the total number (N1) of the reception points which reached the reception determination processing at the step 115, the total number (N2) of the circumscribed spheres to which the exclusion determination is applied at the step 707 until the reception determination processing is finished, and the total number (N3) of the reception points which exist inside the observation region. Assuming that calculation time per exclusion determination of the step 707 is $\delta 3$, and calculation time required for one reception determination of the step 115 is $\delta 4$, calculation time T4 required for the reception determination processing in accordance with the present invention can be approximately obtained by the following equation:

$$T4 = N1 \cdot \delta 4 + N2 \cdot \delta 3$$

On the other hand, calculation time T5 required for the conventional type of the reception determination processing can be approximately obtained by the following equation:

$$T5 = N3 \cdot \delta 4$$

Since, under real environment, in many cases, T4<T5 is established, the reception determination processing in accordance with the present invention is more efficient than the method of the conventional type. However, in the reception determination processing in accordance with the present invention, N2 increases as a ratio of the occupation of the region 1304 in FIG. 19 to the observation region becomes larger, and "N2·$\delta 3$" that is a calculation cost peculiar to the present invention increases. Since generally the region 1304 widens as a propagation distance of a ray increases, a computational effort reduction effect of the reception determination processing in accordance with the present invention demonstrates a tendency that generally it reduces as the propagation distance of the ray increases.

Accordingly, to prevent the efficiency of the reception determination processing in accordance with the present invention from being below the efficiency of the reception determination processing of the conventional type, a cost function g(·) defined by means of the following equation is introduced:

$$g(N1, N2, N3) = T4 - T5 = N2 \cdot \delta 3 - (N1 - N3) \delta 4 \quad (8)$$

In this case, it means that, compared with the method of the conventional type, the method in accordance with the present invention is more efficient as a value of the cost function is smaller.

Figure 25:
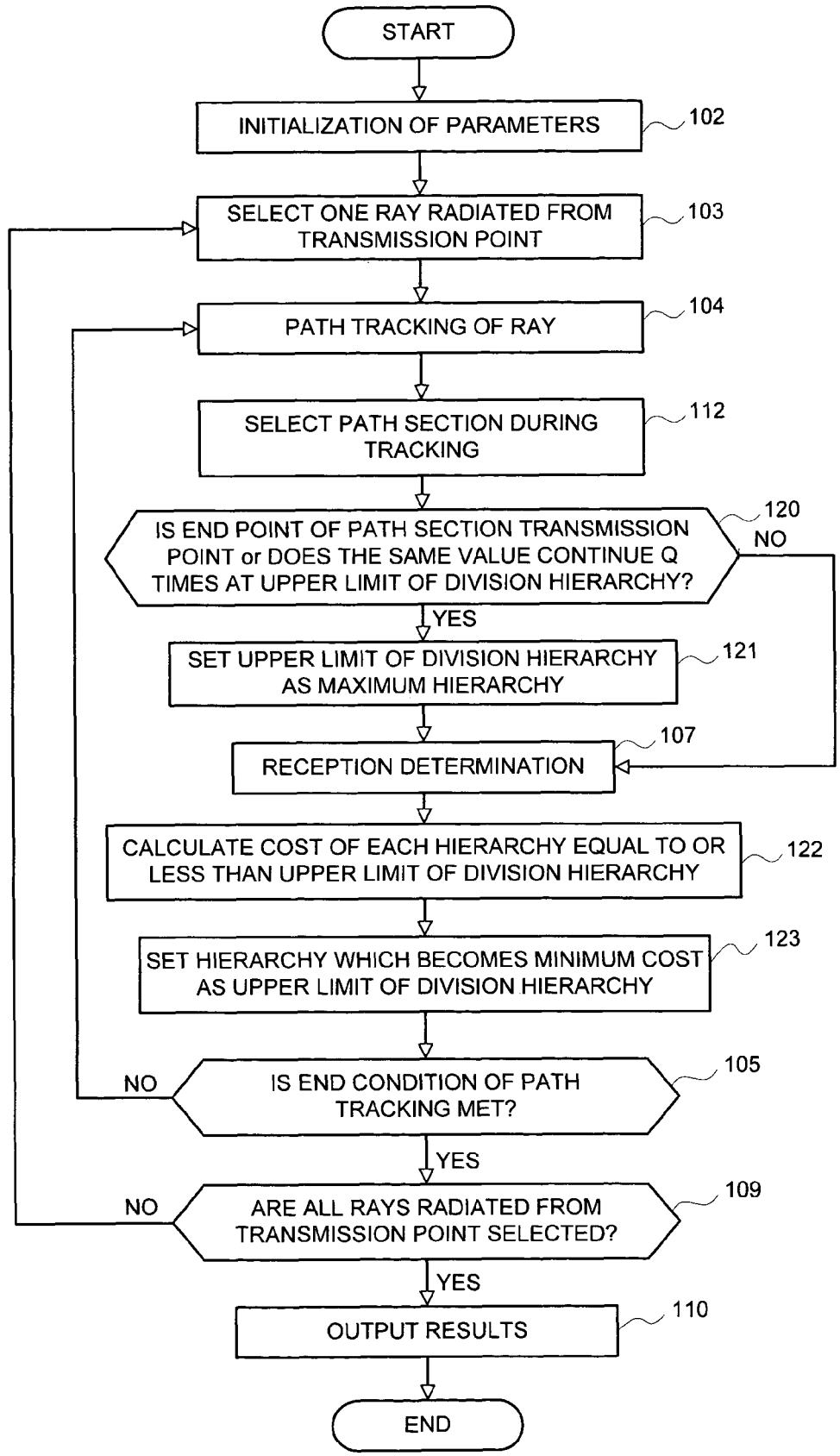
FIG. 25 is a view explaining an operation of reception determination processing in the second embodiment.

FIG. 25 is a flow chart of the reception determination processing in which this cost function is used. For a step 107, the method of FIG. 4 in accordance with the present invention is used. However, for a condition of the division determination for the reception point groups at the step 708 of FIG. 4, a determination condition that "the current hierarchy is equal to or less than an upper limit of a predetermined divisional hierarchy or the reception point groups include a plurality of reception points" is used. A difference between FIG. 25 and FIG. 33 is a reception determination section surrounded by a step 112 and a step 105. First, after a path section is selected at the step 112, it is determined at a step 120 whether or not the said path section is a section just after the radiation from the transmission point. If this determination condition is satisfied, at a step 121, an upper limit value of the divisional hierarchy is set for the maximum hierarchy which can be divided in the observation region. Subsequently, at the step 107, the reception determination of the said section is conducted by using the upper limit value of the divisional hierarchy.

At the step 107, N1 and N2 in a case where the division is stopped at each hierarchy are continuously recorded until the upper limit of the divisional hierarchy is reached, and each value of these values and N3 is assigned to the equation (8), and at a step 122, a value of the cost function in a case where the division of the reception point groups is stopped at each hierarchy is obtained. Thereafter, out of those costs, a hierarchy which takes the minimum value is retrieved, and the hierarchy is set as the upper limit value of the divisional hierarchy (step 123). The above processing continues until the end condition of the path tracking is satisfied (step 105). However, to prevent the upper limit value of the divisional hierarchy from staying at a local minimum value in the process of updating the path, in case that the upper limit value of the divisional hierarchy takes the same value Q times continuously, the upper limit value is reset to an initial value (steps 120, 121). A particular value of Q is experientially determined by means of several trials under real environment.

If the cost function is introduced into the division determination of the reception point groups at the step 708 of FIG. 4 like in this embodiment, since, by appropriately defining the cost function according to the situation, it is possible to stop the division of the reception point groups at a desired arbitrary hierarchy, and make the transition to the reception determination of the involved reception points, flexible and efficient reception determination processing can be realized.

Figure 26:
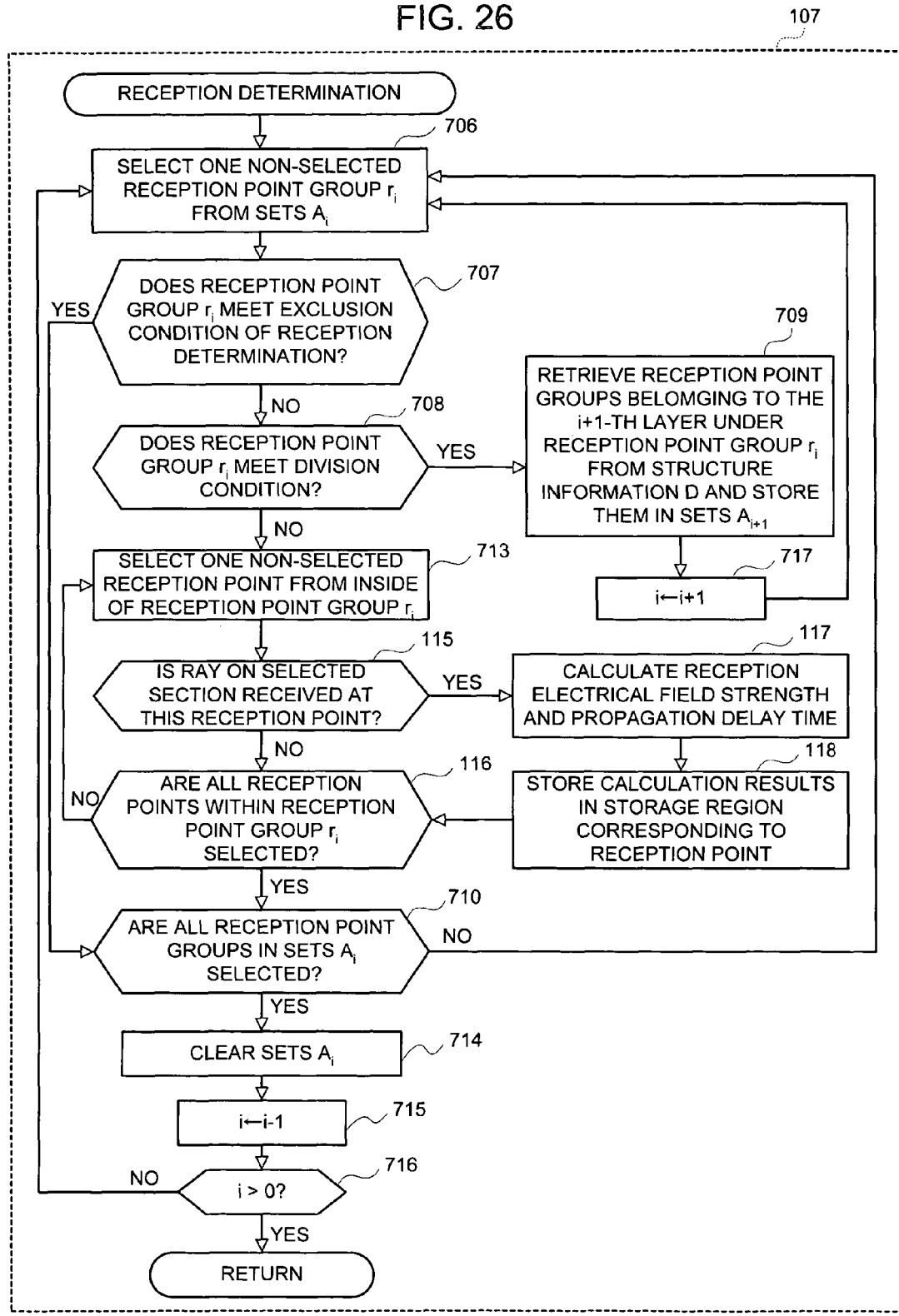
FIG. 26 is a flow chart showing a particular example of an operation of reception determination section in the third embodiment of the present invention.

Next, referring to the drawings, a third embodiment of the present invention will be explained. In the reception determination processing in the first embodiment, the exclusion determination of the step 707 was applied collectively to the reception point groups belonging to the same hierarchy. On the other hand, in the third embodiment, just after it is determined that the selected reception point groups do not meet the exclusion determination of the step 707, one reception point group is selected from the reception point groups belonging to the next hierarchy under the reception point groups, and the exclusion determination of the step 707 is applied thereto. The reception determination processing in accordance with such a recursive arrangement is shown in FIG. 26. The initialization processing of parameters is the same as FIG. 3.

In the third embodiment, after performing the parameter initialization of FIG. 3, first, one non-selected reception point group ri is selected from the sets Ai at a step 706. Next, it is determined whether or not this reception point group ri meets the exclusion condition of the reception determination, which is defined in advance (step 707). Here, if it is determined that the exclusion condition is met, the selected reception point group ri is discarded, and in order to select a new reception point group ri, at a step 710, it is determined whether or not non-selected reception point groups exist in the sets Ai. If it is determined in this determination that the non-selected reception point groups exist, the process returns to the step 706, and the new reception point group ri is selected.

On the other hand, if it is determined on the determination at the step 707 that the reception point group ri does not meet the exclusion condition of the reception determination, the processing of the reception determination is continuously conducted. First, at a step 708, it is determined whether or not the reception point group ri meets the division condition defined in advance, and if it is determined that this division condition is met, after, at a step 709, retrieving the structure information D, and extracting all reception point groups belonging the i+1-th layer under the reception point group ri, and adding them to the sets Ai+1, by making the transition to the next hierarchy at a step 717, the processing after the step 706 is applied.

Figure 29:
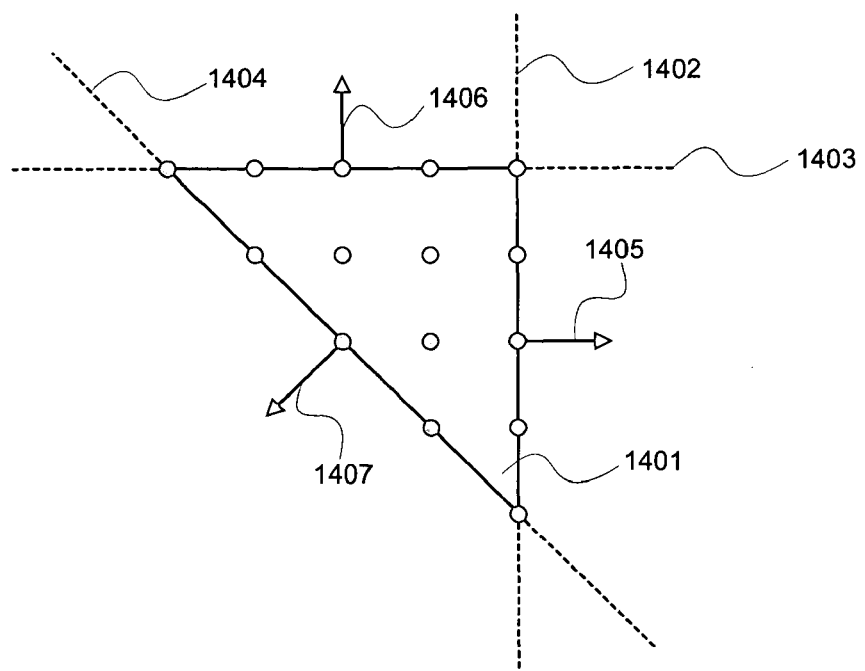
FIG. 29 is a view explaining exclusion determination of the reception point groups in the sixth embodiment.

On the contrary, if it is determined that the reception point group ri does not meet the division condition, it is sequentially determined whether or not a ray on the section selected at the step 112 of FIG. 29 is received at each reception point of the reception point group ri section (steps 713, 115, 116), and if it is received, calculation of electrical field strength and propagation delay time is conducted (step 117), and a result thereof is stored in the storage region (step 118). The above processing is repeated from a hierarchy of the observation region while locally making the transition of the hierarchies up and down (steps 715, 717), and finally, at a step wherein the selection of all elements in the sets A1 is finished, the reception determination processing is finished (steps 716, 119). In case that the above-described third embodiment is followed, an effect same as the first embodiment can be accomplished.

Figure 27:
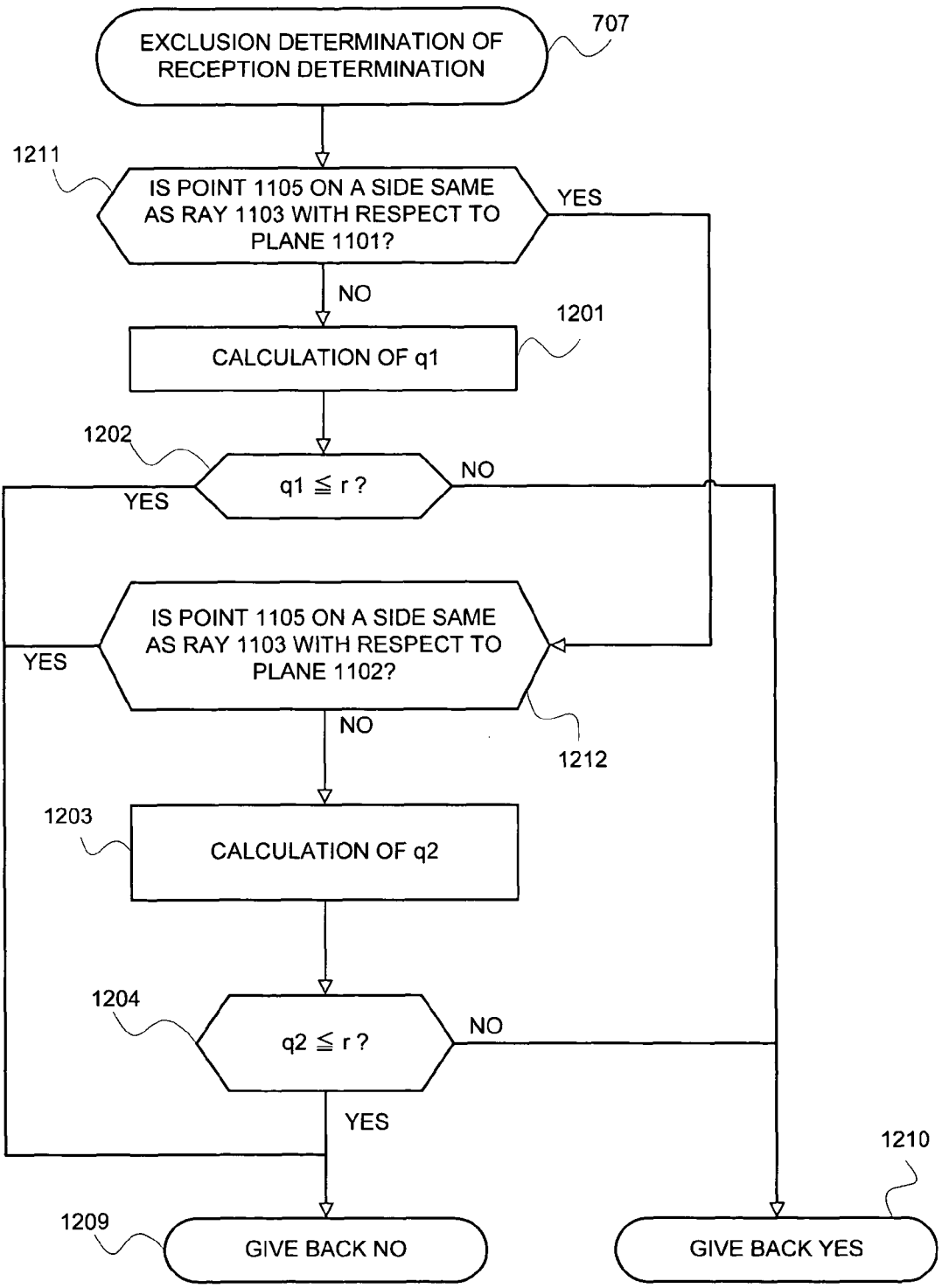
FIG. 27 is a flow chart explaining an operation of exclusion determination of the reception point groups in the fourth embodiment.

Next, referring to the drawings, a fourth embodiment of the present invention will be explained. In the first embodiment, just after the determination consisting of the steps 1201-the step 1204, the step 1211 and the step 1212 of FIG. 17, the determination of the step 1205-the step 1208, in which the partial circular cone is used, is conducted. On the other hand, in the fourth embodiment, as shown in FIG. 27, it has an arrangement in which the determination of the step 1205-the step 1208 is omitted. In case that an interval between the barriers constituting the path section of a ray is narrow, since the number of the reception points within a region sandwiched between the barriers is less, most of the reception points within the observation region are excluded in the determination consisting of the step 1201-the step 1204, the step 1211 and the step 1212, and the exclusion is conducted by a reception point group unit. Accordingly, even though the arrangement of FIG. 27 is used, it is possible to speed up the reception determination processing by means of the prior art.

In the first to third embodiments described so far, in order to facilitate the intersection determination of the region defining the reception point groups and the partial circular cone, the circumscribed sphere for the region defining the reception point groups is newly provided, and the intersection determination of the region defining the reception point groups and the partial circular cone comes down to the intersection determination of the circumscribed sphere and the partial circular cone. However, in the fourth embodiment, since it is not necessary to conduct the intersection determination with the partial circular cone, in case that the region defining the reception point groups is a polyhedron or a polygon, even though the intersection determination of the region defining the reception point groups and an infinite plane including the barrier is conducted directly without providing the circumscribed sphere, it is possible to speed up the reception determination processing by means of the prior art. In this case, by only comparing a spatial relationship between apexes constituting the polyhedron or the polygon and a plane, the intersection determination can be realized easily.

Particularly, an arbitrary point P is taken on a plane F including the barrier, and inner product of a normal vector of the plane F, end point of which is the point P, and a vector connecting the point P to an apex of the polyhedron or the polygon is calculated for each apex of the polyhedron or the polygon. In case that all signs of the calculated inner products coincide with each other, the region defining the reception point groups does not intersect with the barrier, and in case that all of the signs do not completely coincide with each other, the region defining the reception point groups intersects with the barrier. In this manner, the exclusion determination method of the reception point groups, in which the region involving the region defining the reception point groups is not used, largely contributes to the speeding-up of the reception determination processing especially in a case where the number of the apexes of the polyhedron or the polygon forming the region defining the reception point groups is less than the number of the reception points included in the reception point groups.

Figure 28:
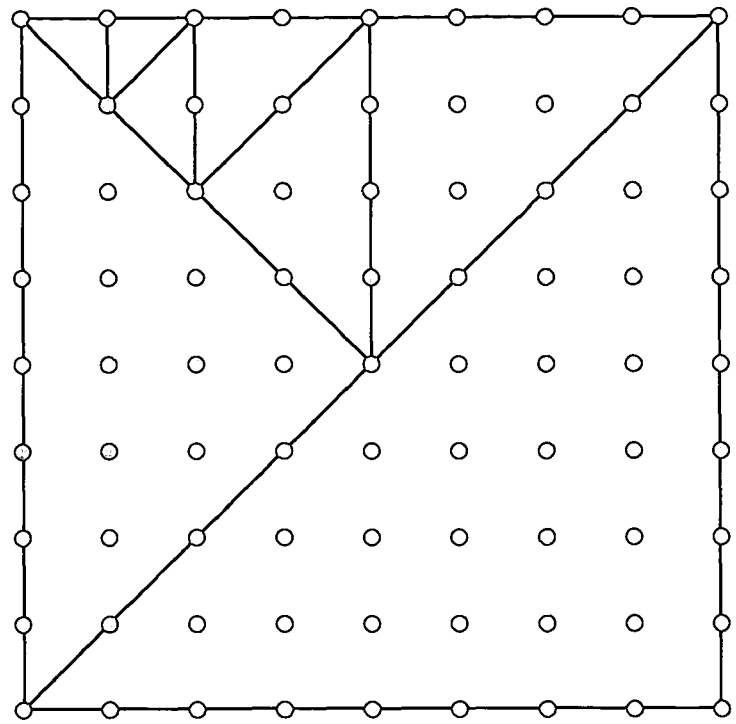
FIG. 28 is a view showing a hierarchical division form of the reception point groups in the fifth embodiment.

Next, referring to the drawings, a fifth embodiment of the present invention will be explained. In the first embodiment, the reception points which stand in line in the shape of lattice on a two-dimensional plane are divided into reception point groups by means of square regions. On the other hand, in the fifth embodiment, a division method other than a square is applied. On example thereof is shown in FIG. 28. FIG. 28 shows a division example of a region to which hierarchical division is partially applied by using triangles having different areas. Especially in a case where the division by means of the triangles and the fourth embodiment are used together, since the number of the apexes of the polygon is less, efficient exclusion determination can be realized.

In this manner, the hierarchical grouping of the reception points inside the observation region can be conducted by means of the partial regions having an arbitrary shape, and the hierarchical grouping can be conducted by using a combination of the partial regions having different shapes, such as a combination of a quadrangle and a triangle. Also, the maximum number of the hierarchies in conducting the division and hierarchization can be set inhomogeneously for every place of the observation region. Further, although, in the first embodiment, a case where the reception points stand in line in the shape of lattice on the two-dimensional plane was raised, the reception determination processing of the present invention, in which the hierarchical grouping of the reception points is conducted, is effective even in a case where the reception points stand in line on the two-dimensional plane inhomogeneously. Further, the reception determination processing in accordance with the present invention is also effective even in a case where the reception points are arranged within a three-dimensional space inhomogeneously.

In the first embodiment, one example of a method for simply obtaining the region defining the reception point groups in a case where the reception points were arranged in the shape of lattice inside the observation region was shown. However, generally, if the region defining the reception point groups is provided in line with criteria that a difference between the region and the region involving the said region is minimized, the total numbers of the reception points included inside each region belonging to the same hierarchy are equal as much as possible, and the total number of the reception point groups of the first layer is minimized, and further, an extreme difference in the total numbers of the reception point groups between adjacent hierarchies does not occur, regions having any form are fine.

For example, in case that propagation estimation of indoor environment is conducted, since there are many cases where the reception points are arranged along a horizontal floor face, generally there are many cases where the reception points stand in line in the shape of two-dimensional plane, and however, in case that, for example, the reception points are arranged along ups and downs of geography in outdoor environment, sometimes the reception points are arranged in a three-dimensional space inhomogeneously. In this manner, even in the environment where the reception points are arranged in the three-dimensional space inhomogeneously, if the reception point groups belonging to each hierarchy is determined in line with the above-described criteria, the reception determination processing in accordance with the present invention can be applied effectively.

Figure 30:
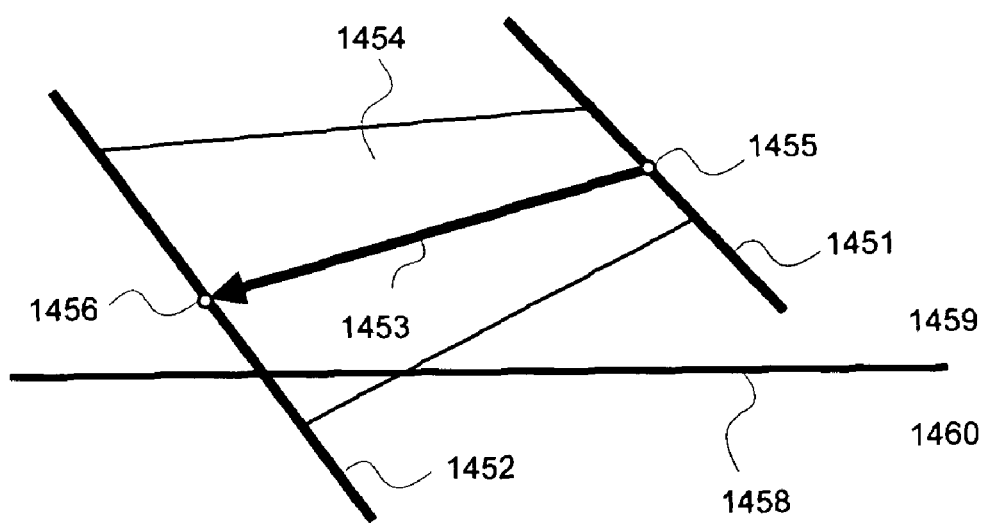
FIG. 30 is a view explaining exclusion determination of the reception point groups in the sixth embodiment.

Next, referring to the drawings, a sixth embodiment of the present invention will be explained. In the first embodiment, for the exclusion determination of the reception point groups, the method in which the circumscribed sphere was utilized was explained. On the other hand, in the sixth embodiment, an exclusion determination method in which a region other than the circumscribed sphere is used as the region involving the region defining the reception point groups is applied. One example thereof is shown in FIG. 29 and FIG. 30. FIG. 29 is a view showing a case where the reception points arranged in the shape of lattice are divided into groups by means of a region 1401 of an triangle. In this embodiment, a plane 1402-a plane 1404 tangent to outer ward sides of the region 1401 are utilized for the exclusion determination of the reception point groups. FIG. 29 shows a case where the plane 1402-the plane 1404 perpendicularly tangent to the region 1401 are seen from above.

Referring to FIG. 30, the method of the exclusion determination will be explained below. FIG. 30 shows a case where, after a ray 1453 passes through or is reflected at a point 1455 of a barrier 1451, it enters a point 1456 of a barrier 1452, and shows a cross sectional view by means of a plane including the ray. In the vicinity of the ray, a partial circular cone 1454 is provided, and the exclusion determination in accordance with this embodiment comes down to inclusion determination of a region 1459 and a region 1460 divided in half by a plane 1458, and the partial circular cone 1454. At this time, the plane 1458 corresponds to a plane including the plane 1402-the plane 1404 and the region 1401 of FIG. 29 for example. Vectors 1405-1407 of FIG. 29 are normal vectors which turn in a direction opposite to a region of the reception point groups with respect to the plane 1402-the plane 1404, respectively.

In the exclusion determination in accordance with this embodiment, first, the intersection determination of the plane including the region 1401, and the partial circular cone 1454 is conducted, and if they do not intersect with each other, it is determined that the said reception point groups are excluded from the reception determination processing. On the other hand, if it is determined that they intersect with each other, it is determined whether or not, in each region on a side the vectors 1405-1407 point out of each region divided in half by the plane 1402-the plane 1404, a plane completely involving the partial circular cone 1454 exists in the plane 1402-the plane 1404, and if even one exists, it is determined that the said reception point groups are excluded from the reception determination processing.

Figure 31:
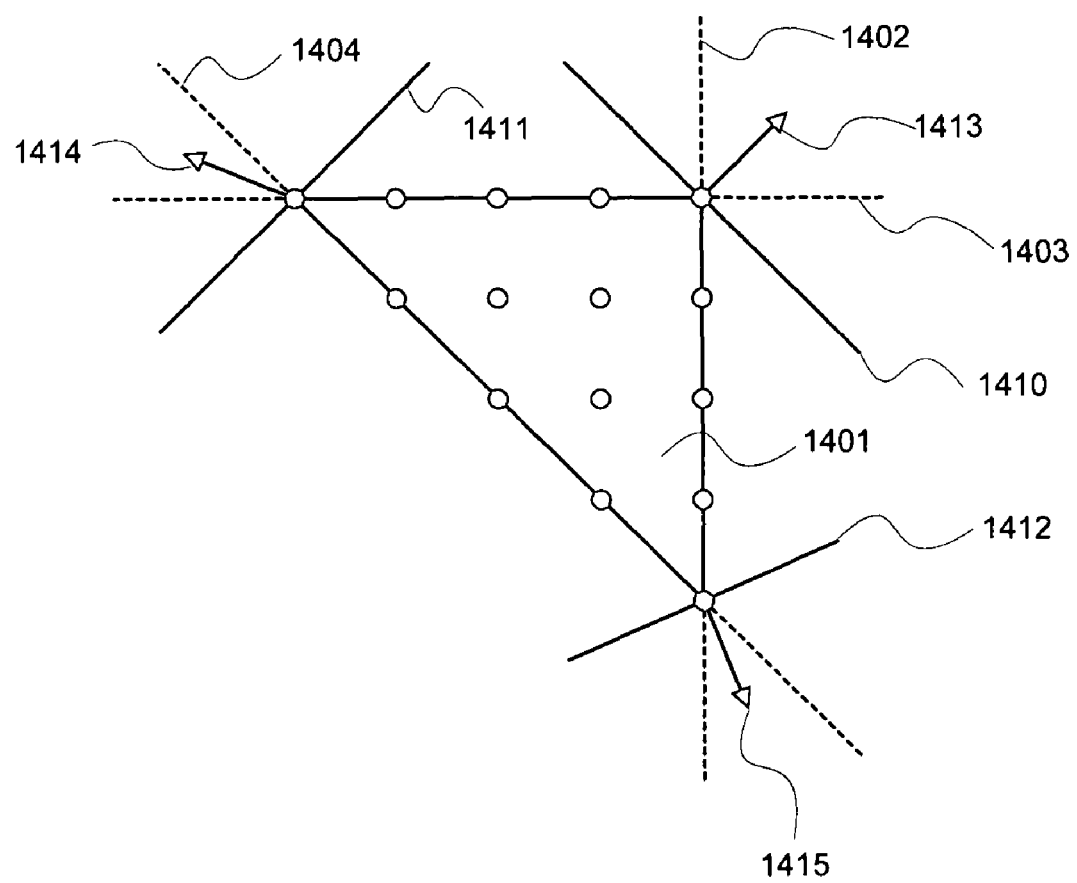
FIG. 31 is a view explaining exclusion determination of the reception point groups in the sixth embodiment.

Further, if it is not determined in the above-described exclusion determination that any is excluded, as shown in FIG. 31, planes 1410-1412 which pass through each apex of the triangular region 1401, and do not overlap with the planes 1402-1404, and vectors 1413-1415 which face to a side opposite to the region 1401 out of normal vectors of the planes 1410-1412 are newly provided, and inclusion determination same as the partial circular cone 1454 is repeated, and only in a case where it is not determined in any determination that they are excluded, final determination that they are not excluded is made.

In case that the method for the exclusion determination of the reception point groups, in which the circumscribed sphere is used, is applied to the reception point groups defined by a triangle like FIG. 29, since a difference between the region defining the reception point groups and the circumscribed sphere is large, many empty regions in which the reception points do not exist are included inside the circumscribed sphere. Accordingly, since the reception point groups to be excluded normally are not excluded in the exclusion determination, a case where unnecessary reception determination calculation of the reception points within the reception point groups and the ray is conducted might occur. On the other hand, in accordance with the sixth embodiment, since such empty regions do not occur, there is an effect that it is possible to reduce the unnecessary determination calculation of the ray and the reception points inside the reception point groups. In addition, such an effect can be also obtained similarly in a case where the fifth embodiment is applied.

Figure 32:
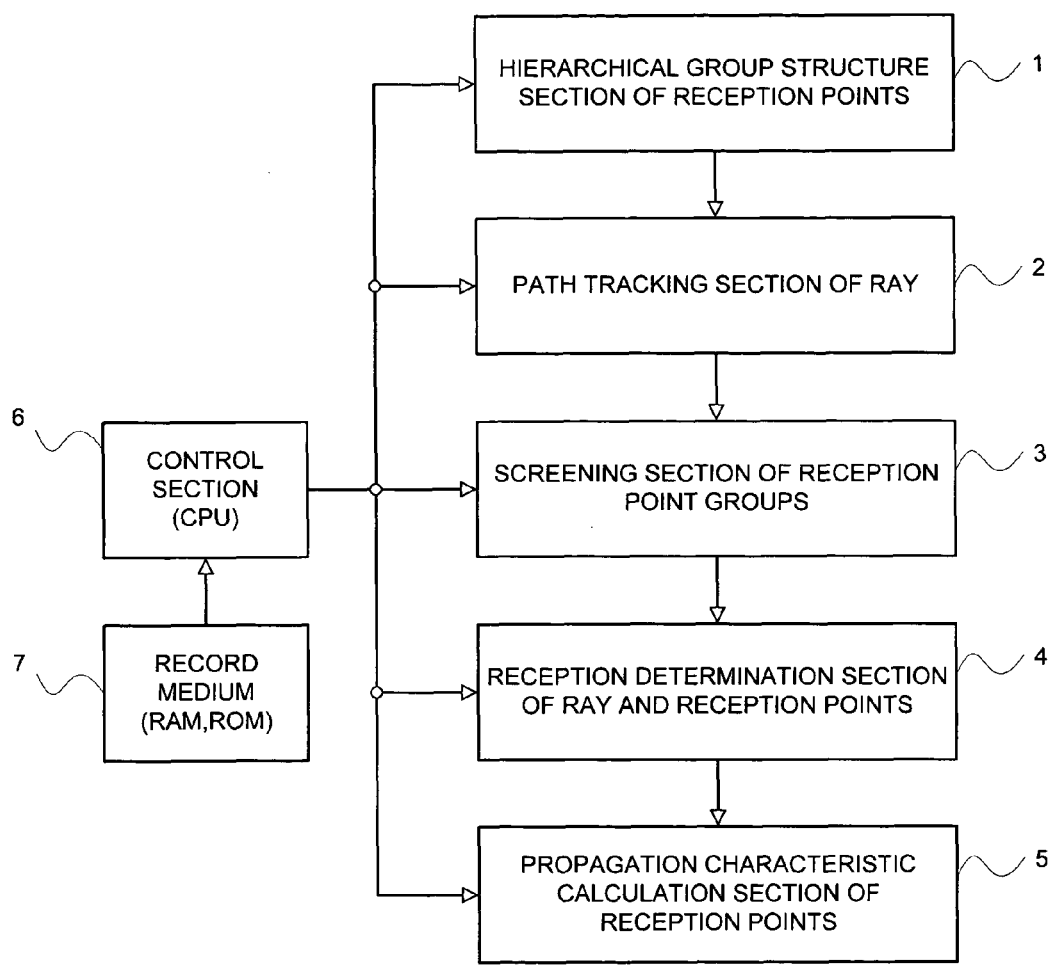
FIG. 32 is a schematic function block diagram showing an arrangement of an embodiment of the present invention.

FIG. 32 is a view showing a function block for realizing a processing operation of each embodiment mentioned above. Referring to FIG. 32, a hierarchical group structure section 1 of the reception points is a block for realizing the processing of the step 203 for structuring hierarchical groups of the reception points, which is shown in FIG. 1, and a tracking section 2 of a ray is a block for realizing the path tracking processing step 104 of the ray, which is shown in FIG. 33. A screening section 3 of the reception point groups is a block for realizing the processing step of FIG. 2 for screening the reception point groups, and a reception determination section 4 of the ray and the reception points is a block for realizing the step for the determination processing on whether or not a ray on the selected section of FIG. 2 is received at the selected reception points. A propagation characteristic calculation section 5 of the reception points is a block for realizing the processing step for calculating reception electrical field strength and propagation delay time of FIG. 2.

A control section 6 controls each of these blocks 1-5, and operates in accordance with an operation procedure of a program stored in a record medium 7 to conduct the control of each section, and is formed of a CPU (computer). The record medium 7 is formed of a RAN and a ROM, and the RAM is a working memory for the CPU, and the ROM stores the program. It is obvious that the operation processing procedure in each of the above-described embodiments is controllable by storing it in this ROM in advance as a program.

As mentioned above, in accordance with the present invention, there is an effect that, compared with the conventional method, it is possible to conduct the reception determination processing in the launching method at a high speed without deteriorating an accuracy. The reason thereof is that, while in the conventional method the reception determination having the same calculation load is successively applied to all reception points arranged within the observation region, in the present invention the hierarchical grouping is applied to the reception points in advance, and the reception point groups to be excluded clearly in the reception determination are collectively excluded by means of the simple determination calculation of a reception point group unit. Thereby, compared with the conventional method, the total number of the final reception points which require the application of the reception determination calculation of the conventional method can be reduced, and it becomes possible to suppress entire calculation time.

What is claimed is:

1. A reception determination method of a ray, in which:
a path of a ray provided within an observation region is predicted, and reception determination processing is applied to reception points of said ray, which are arranged in advance within said observation region; characterized in that the reception points arranged within said observation region are divided into groups for singular or plural reception points, and said reception determination processing is applied to reception point groups including the reception points to which said reception determination processing is needed to be applied; and characterized in that hierarchical grouping processing is applied to said reception points so that a structure in which a reception point group having a large scale involves a smaller scale of plural reception point groups is formed, and hierarchical structure information constructed of information with respect to an implication relationship of the reception point groups between different hierarchies and the reception points included in the reception point groups is constructed.

2. A reception determination method of a ray, in which:
a path of a ray provided within an observation region is predicted, and reception determination processing is applied to reception points of said ray, which are arranged in advance within said observation region;
characterized in that the reception points arranged within said observation region are divided into groups for singular or plural reception points, and said reception determination processing is applied to reception point groups including the reception points to which said reception determination processing is needed to be applied; and
characterized in that screening processing for leaving only said reception point groups including the reception points inside, to which said reception determination processing is need to be applied, is applied to said reception point groups inside said observation region, and said reception determination processing of the ray and the reception points is applied to only the reception points included in said finally screened reception point groups.

3. A reception determination method of a ray recited in claim 2, characterized in that, referring to said hierarchical structure information, said screening processing is conducted stepwise by means of a successive transition from a large scale of the reception point group to a small scale of the reception point group.

4. A reception determination method of a ray recited in claim 2, characterized in that the screening determination for said screening processing is conducted by means of intersection determination of a region where the reception point groups are involved and a partial space which is defined in the vicinity of said ray.

5. A reception determination method of a ray recited in claim 4, characterized in that, in case that a barrier is positioned at both ends of said ray, said screening determination is conducted by means of the intersection determination of a region sandwiched between two planes including the barrier, and said reception point groups.

6. A reception determination method of a ray recited in claim 4, characterized in that, when it is determined whether or not said reception point groups are divided into a smaller scale of reception point groups, said screening determination is conducted by using a value of a cost function defined in advance.

7. A reception determination method of a ray recited in claim 2, characterized in that, in the screening determination for said screening processing, said screening determination is successively applied to each reception point group until it is finished to the reception point groups belonging to the same hierarchy within said observation region, and thereafter, the processing is moved to the next hierarchy consisting of a smaller scale of reception point groups, and similarly, said screening processing is applied to each reception point group until it is finished to the reception point groups which would be a subject of said screening determination inside the same hierarchy.

8. A reception determination method of a ray recited in claim 2, characterized in that, in the screening determination for said screening processing, said screening determination processing is applied to one of the reception point groups within said observation region, and then, a smaller scale of one reception point group involved in said reception point groups is selected from the next hierarchy of a hierarchy to which said reception point groups belong to apply said screening determination thereto, and at a step when arriving at a hierarchy of reception point groups which cannot be finally divided, said reception determination processing of the ray and the reception points is applied to reception points involved in said reception point groups, and thereafter, said screening determination is applied to non-selected reception point groups in a one-stage upper hierarchy, and whereby said screening determination processing is recursively operated.

9. A reception determination method of a ray recited in claim 2, characterized in that, as the region involving said reception point groups, a circumscribed sphere circumscribed with these reception point groups is utilized.

10. A reception determination method of a ray recited in claim 9, characterized in that said reception points are arranged in the shape of a planar lattice in said observation region, and in said hierarchical grouping processing, when lattice points which stand in a line on a most outer side form a rectangle, the number of the reception points (most external contour reception points, hereinafter) which stand in a line on two sides thereof is resolved into a sum of $a^n$ (a is an integer equal to or more than 1, and n is a positive integer including 0), and after square regions in which each factor of the generated $a^n$ by means of the resolution is assumed to be the number of the most external contour reception points are newly generated, out of these square regions, the regions having a greater area are spread inside said observation region as much as possible, and further, by successively dividing each of the spread square regions into $a^2$ square regions having the same area, a hierarchical group of the reception points is structured.

11. A reception determination method of a ray recited in claim 2, characterized in that, as the region involving said reception point groups, a region defined by a combination of regions divided by singular or plural planes is used.

12. A radio wave propagation characteristic estimation method characterized in that:
estimation of radio wave propagation in an observation region is made by predicting a path of a ray provided within said observation region, and reception determination processing is applied to reception points of said ray, which are arranged in advance within said observation region,
characterized in that the reception points arranged within said observation region are divided into groups for singular or plural reception points, and said reception determination processing is applied to reception point groups including the reception points to which said reception determination processing is needed to be applied.

13. A reception determination system of a ray, in which a path of a ray provided within an observation region is predicted, and reception determination processing is applied to reception points of said ray, which are arranged in advance within said observation region, said reception determination system comprising:
grouping means for grouping the reception points arranged within said observation region for singular or plural reception points; and
reception determination means for applying said reception determination processing to reception point groups including the reception points to which said reception determination processing is needed to be applied,
wherein said grouping means applies hierarchical grouping processing to said reception points so that a structure in which a reception point group having a large scale involves a smaller scale of plural reception point groups is formed, and constructs hierarchical structure information constructed of information with respect to an implication relationship of the reception point groups between different hierarchies and the reception points included in the reception point groups.

14. A reception determination system of a ray, in which a path of a ray provided within an observation region is predicted, and reception determination processing is applied to reception points of said ray, which are arranged in advance within said observation region, said reception determination system comprising:
grouping means for grouping the reception points arranged within said observation region for singular or plural reception points;
reception determination means for applying said reception determination processing to reception point groups including the reception points to which said reception determination processing is needed to be applied; and
screening means for applying screening processing for leaving only said reception point groups including the reception points inside, to which said reception determination processing is need to be applied, to said reception point groups inside said observation region, and
said reception determination means applies said reception determination processing of the ray and the reception points to only the reception points included in said finally screened reception point groups.

15. A reception determination system of a ray recited in claim 14, based on said hierarchical structure information, said screening means conducts said screening processing stepwise by means of a successive transition from a large scale of the reception point group to a small scale of the reception point group.

16. A reception determination system of a ray recited in claims 15, characterized in that, as the region involving said reception point groups, a circumscribed sphere circumscribed with these reception point groups is utilized.

17. A reception determination system of a ray recited in claim 16, characterized in that said reception points are arranged in the shape of a planar lattice in said observation region, and in said hierarchical grouping processing, when lattice points which stand in a line on a most outer side form a rectangle, the number of the reception points (most external contour reception points, hereinafter) which stand in a line on two sides thereof is resolved into a sum of $a^n$ (a is an integer equal to or more than 1, and n is a positive integer including 0), and after square regions in which each factor of the generated $a^n$ by means of the resolution is assumed to be the number of the most external contour reception points are newly generated, out of these square regions, the regions having a greater area are spread inside said observation region as much as possible, and further, by successively dividing each of the spread square regions into $a^2$ square regions having the same area, a hierarchical group of said reception points is structured.

18. A reception determination system of a ray recited in claim 14, wherein said screening means conducts the screening determination for said screening processing by means of intersection determination of a region where the reception point groups are involved and a partial space which is defined in the vicinity of said ray.

19. A reception determination system of a ray recited in claim 18, characterized in that, in case that a barrier is positioned at both ends of said ray, said screening determination is conducted by means of the intersection determination of a region sandwiched between two planes including the barrier, and said reception point groups.

20. A reception determination system of a ray recited in claim 18, characterized in that, when it is determined whether or not said reception point groups are divided into a smaller scale of reception point groups, said screening determination is conducted by using a value of a cost function defined in advance.

21. A reception determination system of a ray recited in claim 14, wherein said screening means successively applies the screening determination for said screening processing to each reception point group until it is finished to the reception point groups belonging to the same hierarchy within said observation region, and thereafter, moves to the next hierarchy consisting of a smaller scale of reception point groups, and similarly, applies said screening processing to each reception point group until it is finished to the reception point groups which would be a subject of said screening determination inside the same hierarchy.

22. A reception determination system of a ray recited in claim 14, wherein said screening determination means applies said screening determination processing to one of the reception point groups within said observation region, and then, selects a smaller scale of one reception point group involved in said reception point groups from the next hierarchy of a hierarchy to which said reception point groups belong to apply said screening determination thereto, and at a step when arriving at a hierarchy of reception point groups which cannot be finally divided, applies said reception determination processing of the ray and the reception points to reception points involved in said reception point groups, and thereafter, applies said screening determination to non-selected reception point groups in a one-stage upper hierarchy, and thereby, recursively operates said screening determination processing.

23. A reception determination system of a ray recited in claim 14, characterized in that, as the region involving said reception point groups, a region defined by a combination of regions divided by singular or plural planes is used.

24. A radio wave propagation characteristic estimation system characterized in that estimation of radio wave propagation is made, said radio wave propagation characteristic estimation system comprising:
a reception determination system of a ray, in which a path of a ray provided within an observation region is predicted, and reception determination processing is applied to reception points of said ray, which are arranged in advance within said observation region;
grouping means for grouping the reception points arranged within said observation region for singular or plural reception points; and reception determination means for applying said reception determination processing to reception point groups including the reception points to which said reception determination processing is needed to be applied.

* * * * *